(12) United States Patent
Decanne

(10) Patent No.: US 9,641,524 B2
(45) Date of Patent: May 2, 2017

(54) SYSTEM AND METHOD TO PROVIDE INTERACTIVE, USER-CUSTOMIZED CONTENT TO TOUCH-FREE TERMINALS

(71) Applicant: Sophatar, Inc., San Jose, CA (US)

(72) Inventor: Bart Decanne, Sunnyvale, CA (US)

(73) Assignee: Sophatar, Inc., San Jose, CA (US)

( * ) Notice: Subject to any disclaimer, the term of this patent is extended or adjusted under 35 U.S.C. 154(b) by 0 days.

(21) Appl. No.: 14/975,242

(22) Filed: Dec. 18, 2015

(65) Prior Publication Data

US 2016/0105432 A1     Apr. 14, 2016

Related U.S. Application Data

(63) Continuation of application No. 14/844,240, filed on Sep. 3, 2015, now abandoned.

(Continued)

(51) Int. Cl.
| | |
|---|---|
| H04L 29/06 | (2006.01) |
| H04L 29/08 | (2006.01) |
| G06F 3/16 | (2006.01) |
| G06F 3/147 | (2006.01) |
| G06F 3/14 | (2006.01) |

(Continued)

(52) U.S. Cl.
CPC .......... *H04L 63/0861* (2013.01); *G06F 3/005* (2013.01); *G06F 3/147* (2013.01); *G06F 3/1423* (2013.01); *G06F 3/1431* (2013.01); *G06F 3/167* (2013.01); *G06F 17/3053* (2013.01); *G06F 17/30247* (2013.01); *G06F 17/30424* (2013.01); *G06K 9/00288* (2013.01); *H04L 67/22* (2013.01); *H04L 67/306* (2013.01); *G06Q 30/0269* (2013.01); *G06Q 30/0601* (2013.01); *G07F 17/323* (2013.01); *G09G 2330/022* (2013.01); *G09G 2354/00* (2013.01); *G09G 2370/12* (2013.01); *H04L 63/10* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 8,615,565 B2 | 12/2013 | Randall | |
| 8,689,013 B2 * | 4/2014 | Habraken | ............... G06F 21/32 713/193 |

(Continued)

FOREIGN PATENT DOCUMENTS

KR   10-2008-0108632 A   12/2008

OTHER PUBLICATIONS

Bing search q=mobile+app+shopping+kiosk&src=IE-S Mar. 30, 2016.*

(Continued)

*Primary Examiner* — Jeffrey A Gaffin
*Assistant Examiner* — John M Heffington
(74) *Attorney, Agent, or Firm* — Billion & Armitage; Michael A. Collins

(57) ABSTRACT

A method of displaying content to a user within a managed space comprised of one or more touch-free interactive kiosks includes collecting user data about the user. In addition, the plurality of touch-free interactive kiosks are configured to uniquely identify users located at the kiosk. Based on the identified user, and collected user data associated with the user, content is selected to be displayed to the user.

27 Claims, 14 Drawing Sheets

Related U.S. Application Data

(60) Provisional application No. 62/048,233, filed on Sep. 9, 2014, provisional application No. 62/155,337, filed on Apr. 30, 2015.

(51) Int. Cl.
  *G06F 3/00* (2006.01)
  *G06F 17/30* (2006.01)
  *G06K 9/00* (2006.01)
  G06Q 30/06 (2012.01)
  G07F 17/32 (2006.01)
  G06Q 30/02 (2012.01)

(56) References Cited

U.S. PATENT DOCUMENTS

| | | | |
|---|---|---|---|
| 9,225,701 B2 * | 12/2015 | Gongaware | H04L 63/08 |
| 2004/0054597 A1 | 3/2004 | Gulliver et al. | |
| 2007/0129084 A1 * | 6/2007 | Sylvain | H04W 64/00 |
| | | | 455/456.1 |
| 2009/0197616 A1 | 8/2009 | Lewis et al. | |
| 2010/0144426 A1 * | 6/2010 | Winner | G07F 17/32 |
| | | | 463/25 |
| 2012/0150683 A1 | 6/2012 | Herrington | |
| 2013/0091001 A1 * | 4/2013 | Jia | G06Q 30/0224 |
| | | | 705/14.25 |
| 2013/0263227 A1 * | 10/2013 | Gongaware | H04L 63/08 |
| | | | 726/4 |
| 2014/0006158 A1 * | 1/2014 | Cooper | G06Q 30/02 |
| | | | 705/14.56 |
| 2014/0006451 A1 | 1/2014 | Mullis et al. | |
| 2014/0045586 A1 * | 2/2014 | Allen | G07F 17/3288 |
| | | | 463/25 |
| 2014/0108507 A1 * | 4/2014 | Barker | H01R 13/74 |
| | | | 709/203 |
| 2015/0058157 A1 * | 2/2015 | Tamir | G06Q 90/20 |
| | | | 705/26.7 |
| 2015/0100402 A1 * | 4/2015 | Gadotti | G06Q 20/387 |
| | | | 705/14.23 |
| 2015/0193765 A1 * | 7/2015 | Gadotti | G06Q 20/3276 |
| | | | 705/39 |
| 2015/0199783 A1 * | 7/2015 | Cashman | E04H 3/08 |
| | | | 705/2 |
| 2015/0302474 A1 * | 10/2015 | Lampert | G06Q 30/0255 |
| | | | 705/14.53 |

OTHER PUBLICATIONS

Kioware for android kiosk app Dec. 21, 2015.*
International Search Report and Written Opinion for International Application No. PCT/US2015/048298 dated Nov. 27, 2015, 13 pages.

* cited by examiner

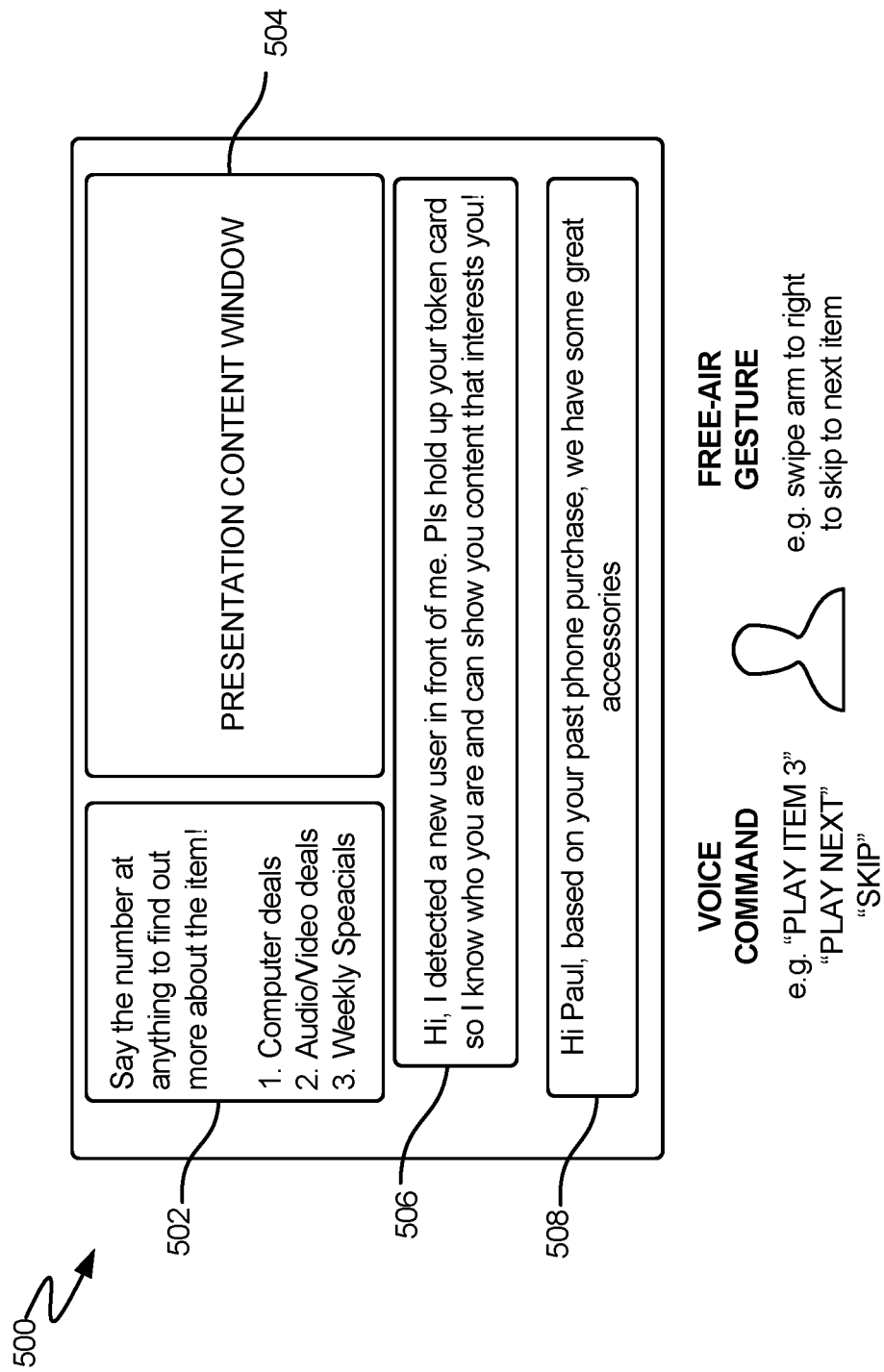

SYSTEM AND METHOD TO PROVIDE INTERACTIVE, USER-CUSTOMIZED CONTENT TO TOUCH-FREE TERMINALS

CROSS-REFERENCE TO RELATED APPLICATIONS

This application is a continuation of U.S. patent application Ser. No. 14/844,240, filed on Sep. 3, 2015 and entitled "System and Method to Provide Interactive, User-Customized Content to Touch-Free Terminals", which claims priority to U.S. Provisional Application No. 62/048,233, filed on Sep. 9, 2014 and entitled "Interactive User-Customized and Auditory Content Presentation Network using Touch-Free Terminals" and U.S. Provisional Application No. 62/155,337, filed on Apr. 30, 2015 and entitled "Multi-Viewer Customized Playout of Audio/Video Assets," the disclosures of which are incorporated by reference in their entirety.

BACKGROUND OF THE INVENTION

The present invention is in the technical field of electronic devices and associated software for the display of information with additional user-interactivity.

On the one hand, prior art in the field of information presentation (kiosk') systems consists of devices for the presentation of content that is either stored locally or contributed by a network. Such one-directional systems deliver a 'playlist' of information content typically embedding audio & video clips, potentially overlaid with text messages and/or other graphical elements. The presented content at any given time can be dependent on a priori known attributes such as the time of day, and/or the location of the system. However there is no user-individualized content nor do these systems allow for user interaction to influence the presented content.

On the other hand, interactive touch-based systems have been introduced. These systems utilize either proprietary large-screen/area touch technology, or re-use consumer touch technology developed for mobile devices, typically for tablets. The information is displayed on the tablet screen, or projection surface, and the user can interact by way of touch gestures, typically by 'tapping' on certain regions that will trigger the display of specific content. When using tablets, the content is displayed on the tablet screen itself and therefore the small screen size limits operation of the device to one user at a time. These systems require the user to 'walk up' to the display or projection surface, and require him to actively engage with it using hand movements. In many scenarios users are rather disinterested, limiting the utility of these systems to applications with high user engagement.

All foregoing systems suffer from one or more of the following: a lack of interactivity (i.e. the user is not able to influence the content presented); a lack of an immersive user experience (e.g., using a small screen such as the phone's built-in display); unable to offer a concurrent multi-user experience; require a user's active engagement; or do not present an individual user-targeted experience.

SUMMARY OF THE INVENTION

According to an embodiment of the present invention, content is displayed to a user within a managed space that includes one or more kiosks. The method includes collecting user data and identifying information associated with the user. Identifying information is utilized to uniquely identify the user at one of the plurality of kiosks, wherein content is selected for display at the kiosk based on the identification of the user.

According to another embodiment of the present invention, a system for displaying content to one or more users within a managed space is provided. The system includes a sign-in station, a plurality of touch-free interactive kiosks, and a central database. The sign-in station collects user information from a user and identifying information. The touch-free interactive kiosks located within the managed space operate to identify users in close proximity to the kiosks and display content selected for the identified user. The central database stores content to be selectively distributed to the plurality of touch-free interactive kiosks, and collected user information and identifying information.

BRIEF DESCRIPTION OF THE DRAWINGS

FIG. 5 is an example view of the presented content on the touch-free interactive kiosk station and how a user may interact with the station to influence this content according to an embodiment of the present invention.

DETAILED DESCRIPTION OF THE INVENTION

The present invention is directed generally to networked systems consisting of multiple fixed-location display devices or kiosks for the presentation of content. In particular, the networked system targets the content displayed to a specific user based on various contextual factors. In addition the networked system allows for user interaction to adjust the presented content in a way that does not require the user to touch the display device. A number of methods of detecting both the presence of a user and uniquely identifying the user detected are described herein. Having identified the user, content may be selected for display based on the interests or likes of the user, such that the displayed content is relevant to the particular user identified. In embodiments in which multiple users are detected and identified with respect to a particular kiosk, then steps may be taken to display content relevant to as many of the users as possible.

Figure 1:
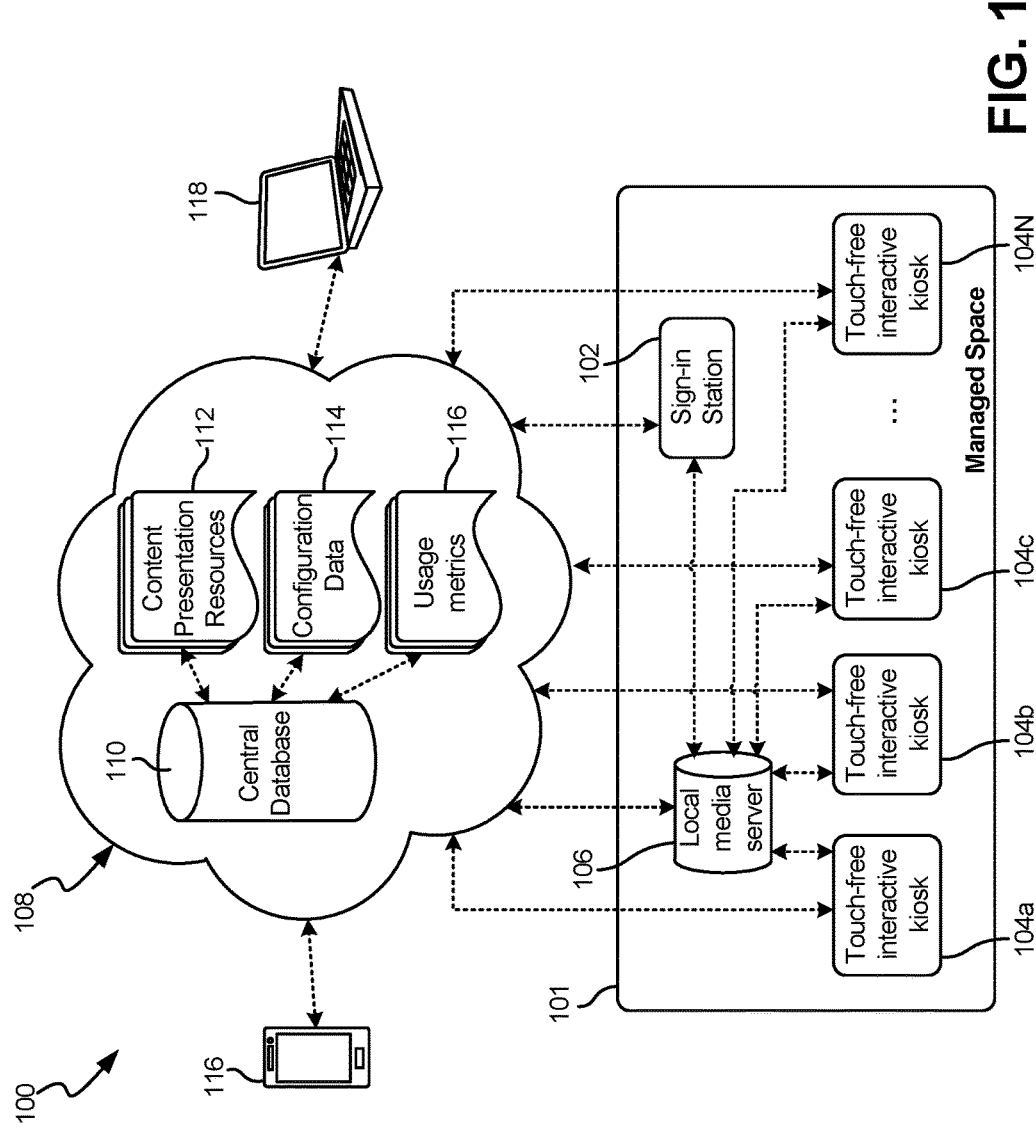
FIG. 1 is a schematic view of an interactive networked information display system according to an embodiment of the present invention.

FIG. 1 is a schematic view of an interactive networked information display system (hereinafter, interactive system) 100. In the embodiment shown in FIG. 1, interactive system 100 is comprised of hardware components that include at least one sign-in station 102, one or more touch-free interactive kiosks 104, and a local media server 106. Touch-free interactive kiosks 104 and sign-in station 106 may be referred to collectively as 'display stations', and are located within managed space 101. In the embodiment shown in FIG. 1, display stations are classified as one of two types: either a 'sign-in station' 102 or a 'touch-free interactive kiosk' 104. Typically there is one sign-in station and multiple interactive kiosk stations within a 'managed space' such as a retail store, museum, or exhibitor stand at a tradeshow. In one embodiment, the sign-in station 102 can be positioned at the entrance to the managed space, while the interactive kiosks 104 are positioned throughout the managed space at fixed locations. For instance in a retail outlet they can be mounted on store shelves.

Each display station is networked, typically via Wi-Fi connection, to the cloud 108, which holds the central system database 110. In one embodiment, a local media server 106 within the managed space's network (intranet) may be used to offload the wide-area network (internet) from bandwidth-intensive data delivery. In the embodiment shown in FIG. 1, there is a real-time two-way communication between the central system database 110 and the display stations 102, 104. Furthermore the display stations may connect to the local media server 106 as needed to download, and cache locally, frequently-used high-bandwidth content. Central database 110 stores a plurality of data, including content presentation resources 112, configuration data 114, and usage metrics 116. In this way, information collected from display stations 102, 104 (and in particular, from sign-in station 104) can be communicated to central database 110 and stored. In addition, content or other data stored by central database 110 may be communicated to display stations 102, 104 for display to a user, wherein in some embodiments or cases data that is used frequently may be stored to local media server to ease the bandwidth requirements associated with communicating large amounts of content to display stations 102, 104.

In addition, cloud 108 is capable of communicating with other web-connected devices, such as user device 116 (e.g., smartphone, watch, tablet, etc.) carried by or associated with the user and/or personal computer 118. In particular, a system administrator may utilize personal computer 118 to access certain portions of the central database 110. Access control is typically reserved for the system administrator, but allows the administrator to modify/add/remove content from central database, as well as review usage metrics and configuration data. For example, the system administrator can retrieve or upload content presentation resources 112 such as audio, video, text and graphics resources, and their associated playlists, for the display stations; can configure individual stations via configuration data 114, and retrieve various data metrics 116 relating to usage of the interactive system. With respect to user device 116, the device is capable of downloading an application or "app", discussed in more detail below. The downloaded app may be utilized, for instance, to establish a form of communication and identification between a user and a touch-free interactive kiosk. As discussed in more detail below, initial interaction between the user and the touch-free interactive kiosk may include prompting the user to download the "app" in order to enhance the user experience and interactivity level. A benefit of the present invention is that the "app", once downloaded, will work with any business or company utilizing the touch-free interactive kiosk.

As described in more detail below, an administrator utilizing personal computer 116 would designate or assign content presentation resources 112 to one or more of the plurality of kiosks 104. Content assigned to a kiosk may be downloaded to local media server 106 for storage, or may be maintained within central database 110. In addition, content may be assigned to a specific kiosk, for example, when the kiosk is being utilized to provide information regarding a product located adjacent to the kiosk, or may be distributed to a plurality of kiosks 104.

As the user enters managed space 101, the user is required to sign-in or otherwise provide identification for subsequent interaction within managed space 101. In embodiments in which the user has downloaded the "app" onto the user's handheld device, identification of the user is done automatically via communication between the touch-free interactive kiosks and the "app" running on the user's device. In this embodiment, sign-in station 102 is not required for identifying the user (although may still be required for identifying other users that do not have a handheld device and/or the "app" downloaded onto their handheld device). Communication between the "app" running on the user's device and one or more of the touch-free interactive kiosks 104 may include communication of user's interests and likes, as well as any other collected user information that may be relevant (e.g., past purchase history, friends, etc.).

In embodiments in which the user does not have a handheld device and/or have the "app" downloaded onto the user's handheld device, then when entering managed space 101, the user must first interact with sign-in station 101 such that the user can be uniquely identified within the managed space. In addition, interactions with sign-in station 101 may include providing information regarding user interests. This information may be collected passively, or may be in response to queries provided by sign-in station 102, and may include prompting to download the "app" to accommodate subsequent visits to managed space 101. In addition, sign-in station 102 provides a mechanism for uniquely identifying the user within the managed space 101. Discussed in more detail below, in lieu of the downloaded "app", identification may be via facial recognition, dispensed visual cue cards, audio passcodes, etc. The user then continues into managed space 101, and interacts with one or more of the plurality of touch-free interactive kiosks 104.

When interacting with a touch-free interactive kiosk 104, the first step is for the kiosk to identify the user or users located in close proximity. Identification of users is touch-free as well, and as discussed above may utilize recognition of the user's registered device via the downloaded "app", facial recognition, assigned visual cue cards, audio passcodes, etc. Identification of the user via the downloaded "app" is preferred, but if not available then one or more of the other methods for identifying the user may be utilized. In one embodiment, touch-free interactive kiosks 104 may detect and/or identify that a user is located in close proximity to the kiosk, but may also determine that the user has not yet downloaded the "app". The detection/identification of the user may be according to methods described above, including facial recognition, motion detection, visual cue cards, audio passcodes, etc. Detection of whether the user has downloaded the app may be based on whether the touch-free interactive kiosk has received any communication at that particular location. If it is determined that the user has not yet downloaded the "app", then touch-free interactive kiosk may display content selected to encourage the user to download the application, which may include additional benefits available to the user by downloading the application.

Once the user has been uniquely identified via one or more of the methods described above, information collected about the user is utilized to select content to be displayed. Content may be selected from a catalogue of content associated with the kiosk, or may be selected from all content made available by central database 110. In addition, the user may make active request for specific content. As described in more detail below, touch-free interactive kiosk may additional include algorithms for managing content to be displayed in situations where a plurality of users are identified, each with different interests/profiles. In addition, users may actively interact with touch-free interactive kiosks 104 to dismiss content, request specific content, etc. Interaction with the touch-free interactive kiosks 104 may be via the "app", or may be via other means.

When the user has downloaded the "app", interaction with touch-free interactive kiosks 104 is done via the "app", which allows a user to provide input to dismiss content, request specific content, etc. In addition, when the user has downloaded the "app" to the user's handheld device, the touch-free interactive kiosk 104 may communicate additional and/or related content to the user's handheld device. For example, in one embodiment touch-free interactive kiosks 104 may be displaying a particular product (e.g., iPhone), while a plurality of related products/items (e.g., iPhone cases) are displayed to the user on the user's handheld device via the "app". This is particularly useful when the content playlist associated with the touch-free interactive kiosk 104 is directed to flagship items (i.e., more expensive items), but users may be interested in content or items related to the flagship item, with these related items displayed on the user's handheld device.

In an embodiment in which the user has not downloaded the "app", the user interacts with touch-free interactive kiosks 104 utilizing other methods, such as voice cues, hand gestures, etc. In one embodiment, a user may make a swiping motion in order to skip content or select different content to display, or utilize a voice command to accomplish the same.

Figure 2A:
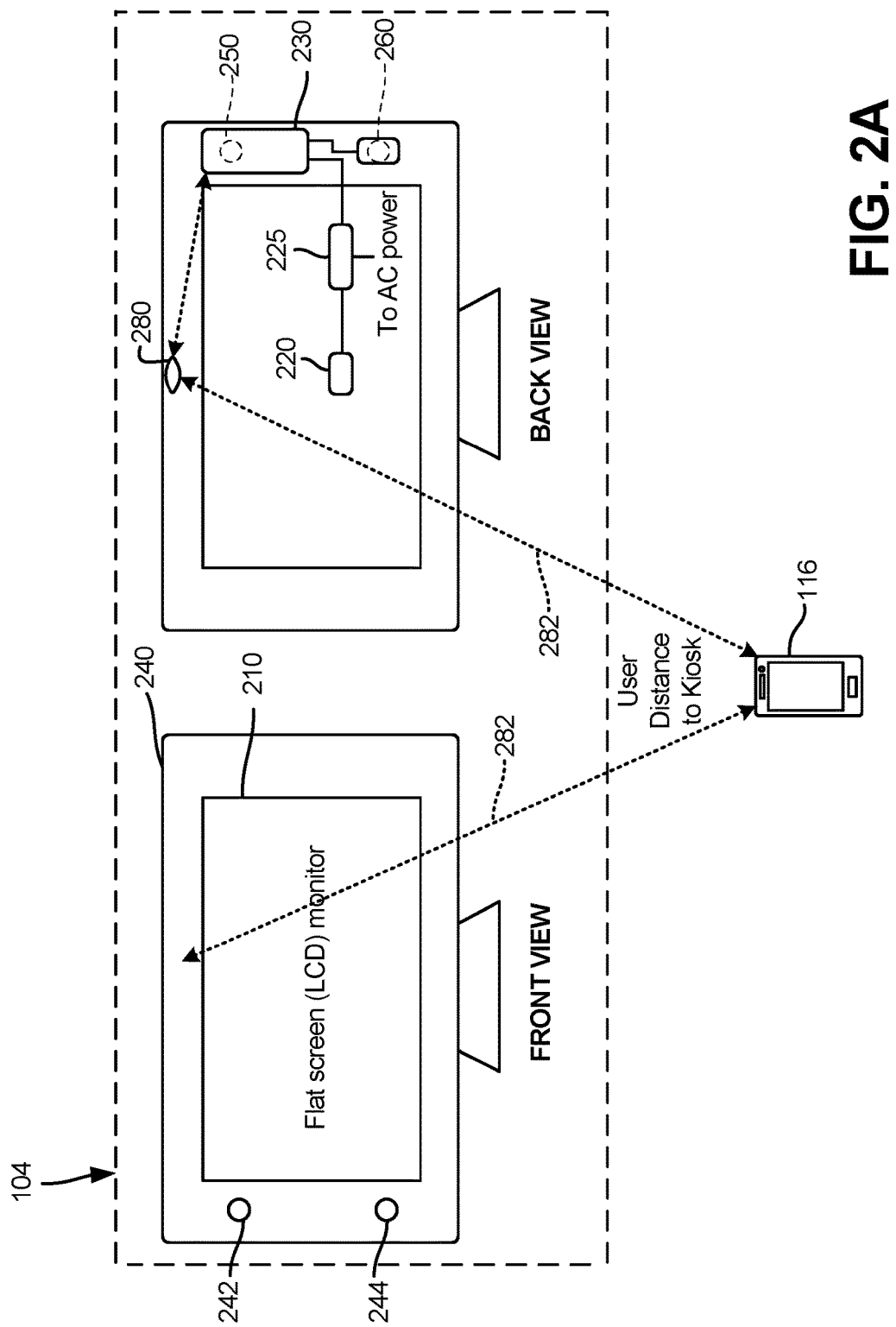
FIG. 2A is a front and back view of a touch-free interactive kiosk utilized in the interactive networked information display system according to an embodiment of the present invention.

FIG. 2A is a front and back view of a touch-free interactive kiosk 104 utilized in the interactive networked information display system according to an embodiment of the present invention. The left-side of FIG. 2A illustrates the front face of the touch-free interactive kiosk 104 (i.e., the portion presented to the user), wherein the right-side of FIG. 2A illustrates the back face or side of touch-free interactive kiosk 104.

In the embodiment shown in FIG. 2A, the front face of touch-free interactive kiosk 104 includes monitor/display 210, bezel frame 240, camera opening 242, and microphone opening 244. The back face of touch-free interactive kiosk 104 includes digital A/V link 220, adapter 225, mobile internet device 230, camera 250, microphone 260, and location emitting device 280. Content is delivered to touch-free interactive kiosk 104 via mobile internet device 230 and A/V link 220 to the input of monitor 210. In this way, selected content can be displayed to a user via monitor 210. In one embodiment, the display area of monitor 210 is 27" or greater, and may utilize rear- or front-screen projector, LED, LCD, or another type of display apparatus. Mobile internet device may be any device capable of communicating bi-directionally with cloud 108 and specifically with central database 110, and providing an A/V output to display content to monitor 210. For example, in one embodiment mobile internet device 230 is an iOS device such as an iPad or iPod Touch, wherein adapter 225 is utilized to split the HDMI and AC power supply signals. In other embodiments, other mobile internet devices capable of communicating bi-directionally with cloud 108 may be utilized.

An extended bezel frame 240 is attached around the LCD monitor to provide unique branding as a device within the platform of this exemplary embodiment. It also serves as a fixture for the mobile internet device 230, which is mounted in a secure way on the backside of the frame with an opening 242 in the frame for its front-facing camera 250. When voice interactivity is supported, an external microphone 260 may be connected to the internet device. The microphone is directed towards the user using a second opening 244 in the extended bezel frame 240.

In addition to communicating content to monitor 210, touch-free interactive kiosk 104 additionally seeks to monitor user activity in the vicinity around touch-free interactive kiosk 104. Monitoring may include monitoring/identifying users near the kiosk, as well as the location of the identified users relative to the kiosk. To this end, a number of collected inputs may be utilized either alone or in combination with one another to monitor, detect and/or identify users. For example, location-emitting device 280 may be utilized to detect users in the vicinity of kiosk 104. In one embodiment, the location-emitting device 280 is a low-energy emitting beacon (e.g., Bluetooth) or alternatively an ultrasound emitter affixed to the frame of kiosk 104. The signal emitted by the location-emitting device 280 is detected and measured by a user device associated with the user and located on the user's person, wherein measuring the signal includes identifying the beacon ID communicated by the location emitting device 280 and measuring specific attributes of the signal (e.g., received signal strength). In response to the detected signal, the user's device communicates to mobile internet device 230 the identified beacon ID and such an attribute of the signal measured at the user device, wherein the characteristic of the signal is indicative of the user's distance from the location-emitting device. In one embodiment, the determination of user distance from the kiosk is made locally at touch-free interactive kiosk 104, while in other embodiments the received information is communicated to cloud 108 for a determination of user location. In some cases, the determined location of the user is communicated to cloud 108 for selection of content, while in other embodiments, the determined location of the user is utilized locally by touch-free interactive kiosk 104.

In one embodiment, the correlation between the received signal characteristic and distance can be calibrated by positioning location-emitting device 280 a known distance 282 from the mobile internet device 230. The emitted beacon signal is monitored by mobile internet device 230 and the known distance is used to calibrate the correlation between distance and signal strength. In particular, the calibration can aid to determine the distance 282 of a user to the display when the user has a handheld or wearable device with the 'app' active as this 'app' will signal the identified beacon ID, and its received signal characteristic, from the beacon to the cloud-based central database. Identification of a user within close proximity to a particular kiosk 104 allows the user to interact directly with the associated kiosk 104. For example, a user may be allowed to send messages to the kiosk 104, allowing the user to control the content displayed by kiosk 104 as well as allowing the user to post messages/comments directly that will be displayed on the kiosk 104 at which the user is located, as well as other kiosks within the managed space 101. Furthermore, in another embodiment, identification of a user device within close proximity to kiosk 104 allows the kiosk to not only display information selected for that user at kiosk 104, but may also allow the kiosk 104 to deliver content for display to the user's handheld device for display via the "app" running on the user's device. This may include, for example, other products related to the product/products displayed via kiosk 104, location/directions to other products of interest to the user, as well as other content that may be of interest to the user and more appropriate for display to the user's device, rather than via the kiosk 104.

In embodiments in which the user does not have a smartphone or other type of personal device, and therefore does not have an app installed for monitoring a signal emitted from the location-emitting device, other available methods may be utilized to detect user presence in front of the display. In one embodiment, camera 250 collects visual data and utilizes one or more of motion detection, face detection, or detection of a unique visual token that is held by the user in front of the display to detect and identify users in close proximity to kiosk 104. While simple motion detection/face detection may be sufficient to detect the presence of users, identification of particular users may require additional image/video processing techniques such as face recognition, or image feature recognition. As an example of the latter case, in one embodiment each user is assigned a unique visual cue card, either at sign-in station 102 or elsewhere. When approaching a touch-free interactive kiosk 104, the user displays the visual cue card to camera 250, wherein analysis of the visual cue card (either locally at kiosk 104 or remotely in cloud 108) allows the system to identify the particular user or users at each kiosk 104. In another embodiment, either alone or in conjunction with other means of detecting users, audio input received from microphone 260 may be utilized to detect and identify users. For example, in one embodiment each user is assigned a password, either at sign-in station 102 or elsewhere. When approaching kiosk 104, the user is asked to provide the password or passcode, which is recognized either locally at kiosk 104 or remotely at cloud 108 and used to identify the user located in close proximity to the kiosk.

In absence of a detected app on the user's handheld device, user authentication using either image/video recognition or audio recognition is established at the sign-in station 102. If an 'app' is active, the sign-in information may already be contained in the user profile 610 inside the app. As described in more detail below, based on the detection and identification of one or more users, content—and in some cases content unique to the user identified—is displayed via touch-free interactive kiosk 104.

Figure 2B:
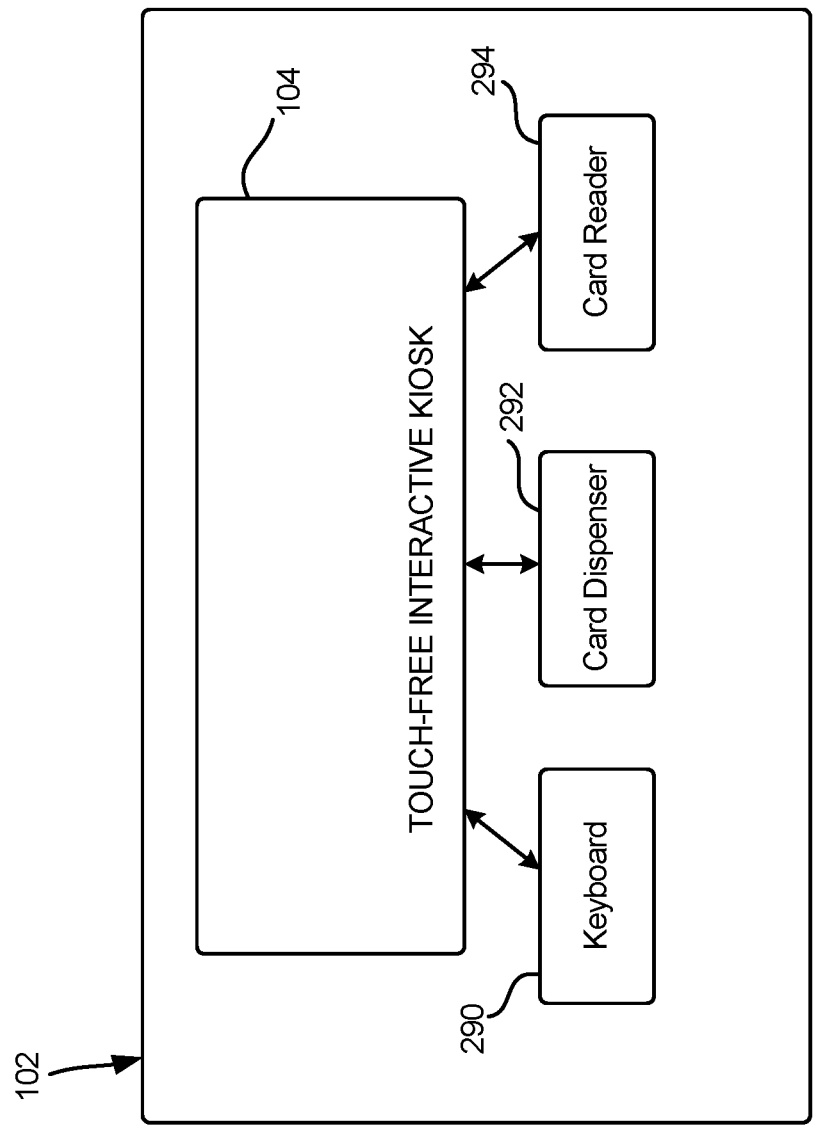
FIG. 2B is a schematic view of a sign-in station utilized in the interactive networked information display system according to an embodiment of the present invention.

FIG. 2B is a schematic view of a sign-in station 102 utilized in the interactive networked information display system according to an embodiment of the present invention. Hardware included in sign-in station 102 consists of much of the same hardware included as part of touch-free interactive kiosk 104, described with respect to FIG. 2A. In the embodiment shown in FIG. 2B, a portion of sign-in station 102 is labeled touch-free interactive kiosk 104, indicating that the same hardware described with respect to FIG. 2A may be utilized to implement a portion of sign-in station 102. In addition, sign-in station 102 may include one or more additional hardware components attached to the touch-free interactive kiosk portion 104. These additional items can be: a keyboard 290 connected to the station's mobile internet device, a dispenser 292 for dispensing a card which has a unique visual pattern (token'), and a magnetic stripe reader 294. For example, keyboard 290 allows a user to complete tasks such as creating a user profile, identifying interests, etc. Depending on the capabilities incorporated into touch-free interactive kiosks 104, various hardware components may be utilized. As discussed previously, sign-in station 102 includes many of the same components found in touch-free interactive kiosk, including monitor or display, mobile internet device for communicating with user devices and/or central database 110 located in the cloud 108, as well as cameras, microphones, and location emitting device to the extent required to identify users located at sign-in station 102.

In one embodiment, a primary function of sign-in station 102 in addition to creating/updating the user's profile is to prompt the user to download the application or "app" to the user's handheld device (e.g., smartphone, tablet, etc.). Prompts from sign-in station 102 may include audio prompts (e.g., text-to-speech, audio content, etc.), and/or visual cues to prompt the user to download the "app" to the user's device. If the user does not have a handheld device, or declines downloading of the app, sign-in station 102 relies on other means to uniquely identify the user as described above (e.g., visual cue cards, audio passcodes, etc.).

Figure 3:
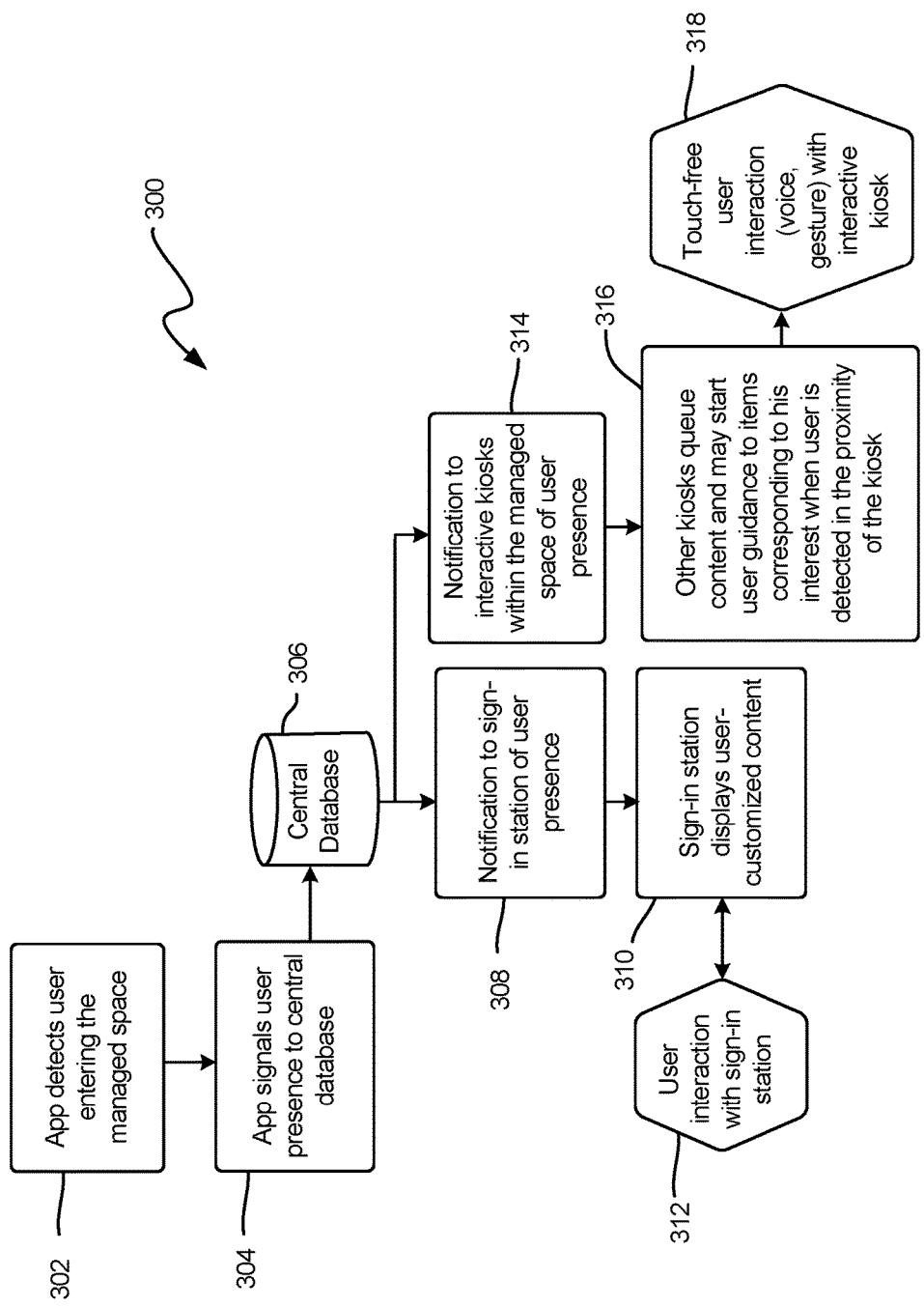
FIG. 3 is a flowchart illustrating the detection of a new user by the interactive display system via an application installed on a device associated with the new user according to an embodiment of the present invention.

FIG. 3 is a flow chart illustrating the process 300 for detecting a new user via an application installed on a user device 116 associated with the new user according to an embodiment of the present invention. The process begins with a user entering the managed space, which is defined as the area that includes at least one of touch-free interactive kiosk 104 and optionally sign-in station 102. At step 302, an application (i.e., "app") which is active on the user's device 116 determines that the user device has entered managed space. This determination may be based on detection of a beacon communicated by the sign-in station 102 or by one of the plurality of touch-free kiosks 104. In other embodiments, this determination may be made based on interaction between the user device and the sign-in station 104, either automatically or at the request of the user. At step 304, the application communicates an identification (ID) associated with the user in order to signal the user's presence within the managed space. In one embodiment, the communication is provided via the sign-in station 102 (shown in FIG. 1). However, in other embodiments the communication may be provided directly to central database 110. Central database 110 compares the user identification communicated by the application installed on the user's hand-held device to a list of identifications of users currently operating within the managed space, in order to determine if the user is a "new" user. If a new user is detected, a notification is sent to both the sign-in station 102 and each interactive kiosk 104 within the managed space 20 at steps 308 and 314, respectively. If the user is located in close proximity to sign-in station 102, then the sign-in station displays content customized for the identified user. For example, personalized content may be shown to welcome the user, with further user interaction initiated at step 312 to collect additional information from the user, as described in more detail below. In addition, at steps 316 the one or more touch-free interactive kiosks 104 may queue content selected for the identified user. Selections may be based on identification of the user as a "new" user, or may be based on additional information provided by the user, either via sign-in station 102 or collected directly from the user's device. Content queued up for this user at the one or more touch-free interactive kiosks 104 remains queued until the user is detected in the vicinity of a particular kiosk. In addition, as the user interacts with sign-in station 102 and one or more of the touch-free kiosks 104, content provided to the user may be utilized to provide user guidance to items corresponding to identified user interest. For example, active indoor guidance of a user by way of visual and auditory cues between kiosks can be developed based on user proximity detection by each station. At step 318, the user interacts with the content displayed at one or more of the touch free interactive kiosks. As described in more detail below, the interaction may be via voice, gesture, the "app", or via other inputs provided by the user.

Figure 4A:
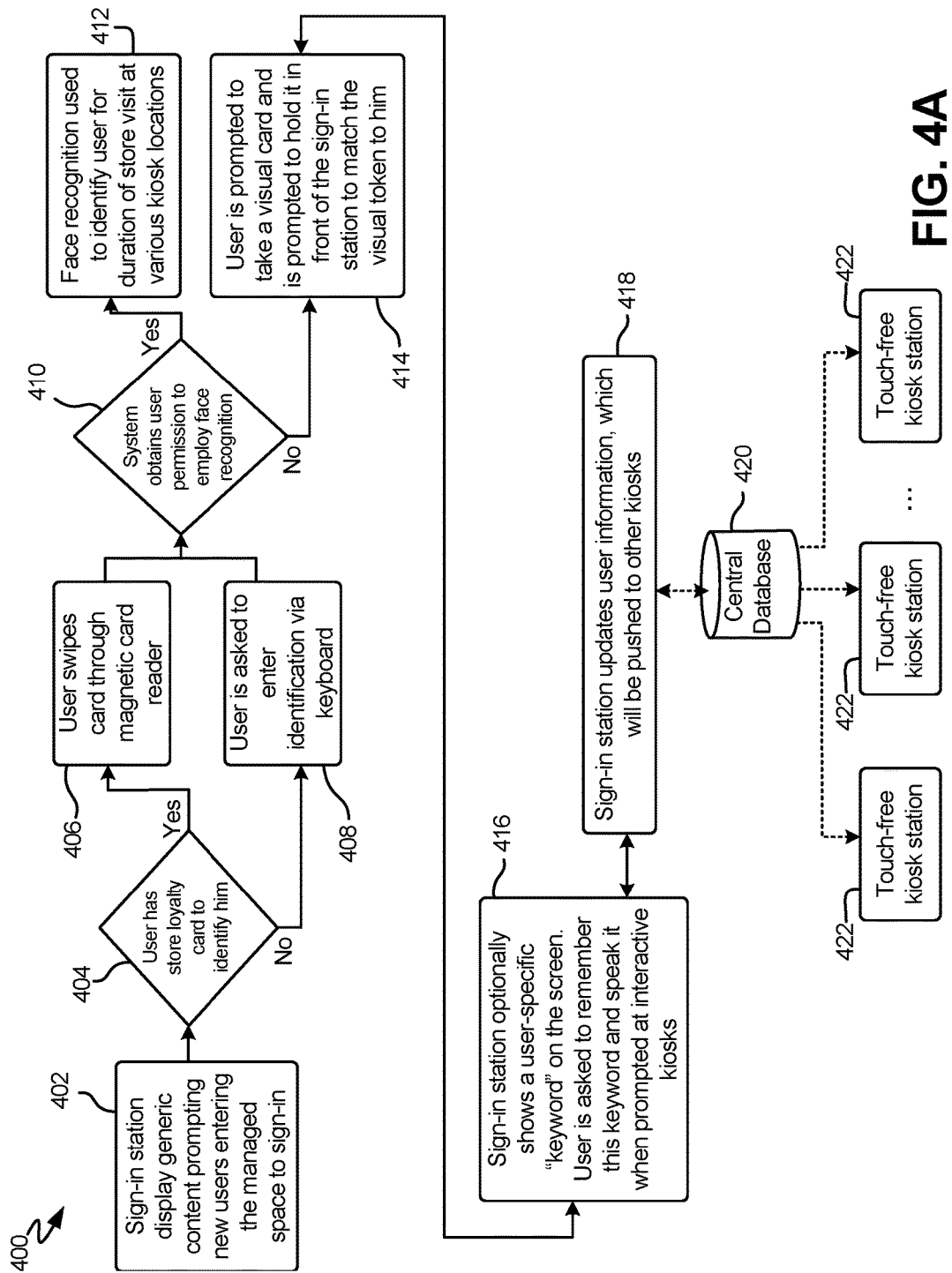
FIG. 4A is a flowchart illustrating interaction of the user with the interactive display system at a sign-in station according to an embodiment of the present invention.

FIG. 4A is a flow chart illustrating interaction of the user with the interactive display system at a sign-in station according to an embodiment of the present invention when the user does not have the appropriate application or "app" loaded and active and the user's device. As a result, in this embodiment the user is required to interact with sign-in station 102 in order to register with the interactive system. At step 402, sign-in station 102 displays generic content (i.e., not unique to the user) that prompts the user to sign-in with the system. For example, in the embodiment shown in FIG. 4A, at step 404 this includes displaying content asking the user whether or not the user has a store loyalty card. If the user does have a store loyalty card, then at step 406 the user swipes the card through a magnetic card reader associated sign-in station 102 (as described with respect to FIG. 2B), wherein the store loyalty card identifies the user to sign-in station 102, which in turn provides the identifying information to central database 110. As an alternative to the card reader, a near-field communication device may be used. If the user does not have a store loyalty card, then at step 408 the user is prompted to provide identifying information via other means, such as via a keyboard associated with sign-in station 102 (as shown in FIG. 2B). Once again, information collected via sign-in station 102 is communicated to central database 110. Whether the user is identified via a store loyalty card or by entering user information, in addition to simple identifying information the user may also provide information regarding interest, preferences, etc. In either embodiment, additional information may be provided via a keyboard or other input means (e.g., on-screen menu).

At step 410, sign-in station 102 optionally may request permission from the user to utilize facial recognition to identify the user throughout the managed space. If the user agrees, then at step 412 facial recognition is used for the duration of the user's stay in the managed space. In one embodiment, if the request is granted, then at step 412 identifying face features are extracted from a photograph taken at the sign-in station and will be used by other kiosks to detect user presence within its field of view. In other embodiments, rather than facial features, an analyzed image of the entire user is utilized to uniquely identify the user (e.g., color histogram of the user). If the user does not acquiesce to facial or other types of visual recognition, then at step 414 the user is prompted to take a unique visual cue card and hold the cue card in front of the camera in order to uniquely associate the visual cue card with the user. Alternatively, at step 414 the user is requested to pick up a card with a unique visual pattern from the card dispenser at the sign-in station. Using image object recognition at each kiosk, this can identify the user's presence at other interactive kiosks but does not require use of the user's biometrics. The latter method may be compared to a bar code scan to identify an item, however in this case the unique scan is associated with a user, rather than a sales item, and presents a novel use of the capability.

Embodiments that utilize a token card may take advantage of a more appealing visual pattern than a typical bar code, which is possible as this use case only requires uniquely identifying a small numbers of users who may be present in the 'managed space' at any given time (e.g., less than a hundred), thus relaxing the number of unique patterns that are to be supported.

As an alternative to or in conjunction with the methods described as steps 404 through 414, user identification may include at step 416 displaying to the user at sign-in station a user-specific unique "keyword" that the user is asked to remember. As the user interacts with touch-free interactive kiosks 104 located within the managed space, the user is prompted to say the keyword. Microphones located at each touch-free kiosk 104 are able to identify the user located at the kiosk via recognition of the keyword provided by the user.

At step 418, having uniquely identified the user via one of the above-identified methods, sign-in station 102 updates user identification information and pushes the identifying information to touch-free interactive kiosks such that each kiosk is capable of uniquely identifying users within the vicinity of the kiosk. In the embodiment shown in FIG. 4A, sign-in station 102 communicates the identifying information to central database 110 at step 420, which in turn communicates or pushes the necessary identifying information to each of the plurality of touch-free interactive kiosks 104 at step 422. In other embodiments, sign-in station 102 may communicate the identifying information directly to touch-free interactive kiosks 104.

Figure 4B:
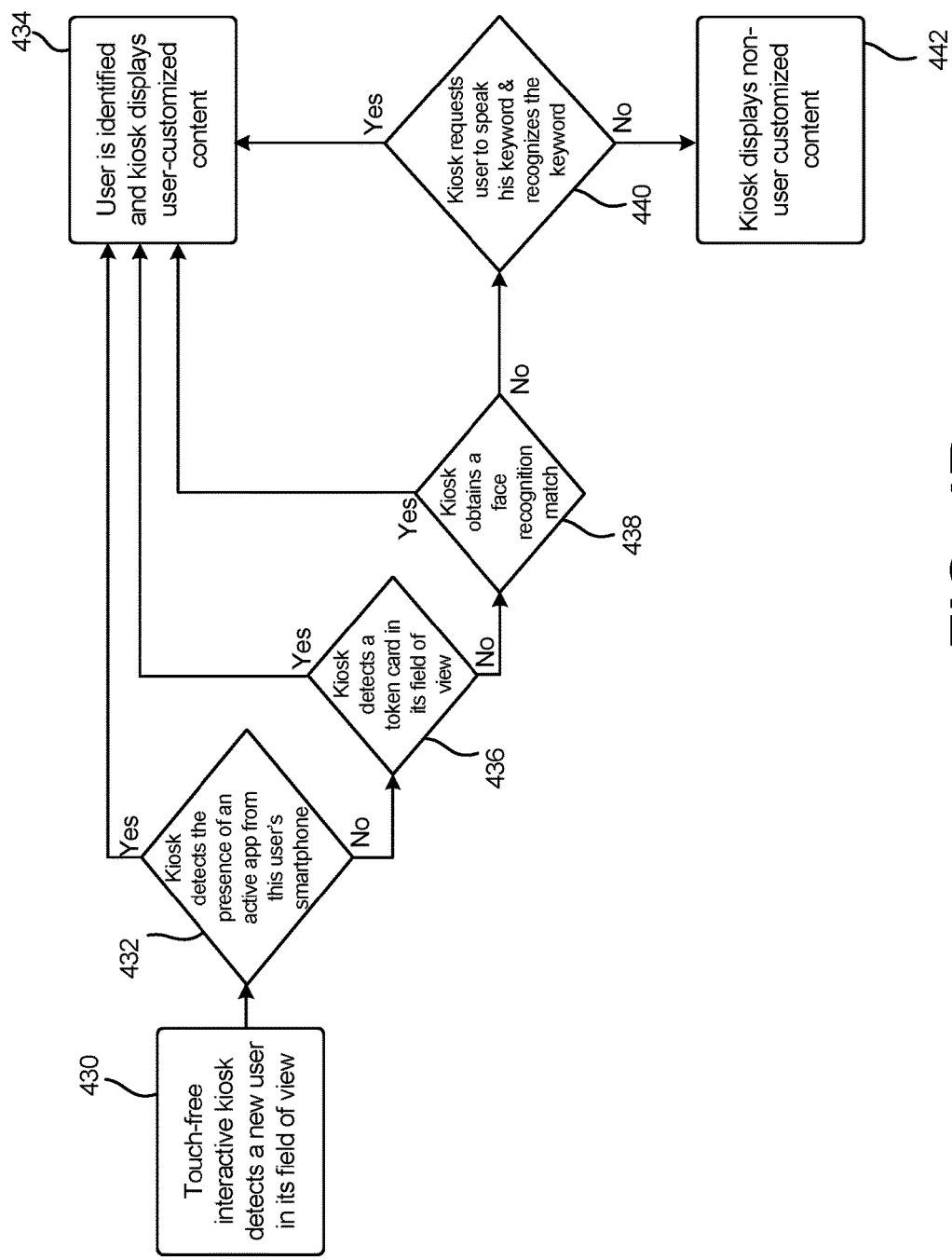
FIG. 4B is a flowchart illustrating interaction of the user with the interactive display system at a touch-free interactive kiosk according to an embodiment of the present invention.

FIG. 4B is a flow chart illustrating interaction of the user with the interactive display system at a touch-free interactive kiosk according to an embodiment of the present invention. At step 430, touch-free interactive kiosk 104 detects the presence of a user. In one embodiment, this detection is based on the field of view available to the camera associated with interactive kiosk 104. In other embodiments, detection may be based on identification of a signal provided by the app on the user's device. At step 432, in response to the detected presence of a new user, touch-free interactive kiosk determines whether a user can be identified via communication with the "app" running on the user's device. If the user is utilizing the appropriate application, and can be identified in this manner, then at step 434 the interactive kiosk 104 identifies the user and displays unique content to the user based on the identification. Otherwise, at step 436 the system may detect the presence of a user in its field of view and request the user to display the visual cue card assigned to the user at the sign-in kiosk 102 for identification purposes. If identified in this manner, then at step 434 the kiosk displays content customized for the identified user. If the user was not assigned a visual cue card, but rather acquiesced to facial recognition, then at step 438 the touch-free interactive kiosk 104 captures images of the user and utilizes image recognition to identify the user. Once again, facial recognition algorithms may be executed locally by interactive kiosk 104 or may be executed remotely by central database 110. Once again, once identified, user-customized content is delivered to the interactive kiosk for display to the identified user. If none of the other methods is available, the interactive kiosk 104 may request that the user speaks the keyword provided to the user at the sign-in kiosk 102. The interactive kiosk 104 identifies the user based on the keyword provided—again, either locally or remotely—and delivers user-customized content for consumption by the user at step 442. In other embodiments, various combinations of the discussed identification methods may be utilized to detect and/or verify the identity of the user located near the kiosk.

As described above, content displayed by touch-free interactive kiosk 104 may be selected from content stored locally at kiosk 104 and corresponding to interests associated with the identified user, or may be communicated to kiosk 104 from central database 110 (or local media server 106) based on the identification of the user.

FIG. 5 is an example view of unique content 500 presented to a user via the display of touch-free interactive kiosk station and how a user may interact with the station to influence this content according to an embodiment of the present invention. In the embodiment shown in FIG. 5, content 500 is divided up into a plurality of windows, including playlist window 502, presentation content window 504, system message window 506, and user-personalized content window 508.

As described above, having identified the user located at touch-free interactive kiosk 104, unique content is selected based on the identification and delivered to kiosk 104 for display to the user. For example, the system may perform a look up of the user's interests in relation to the items at or near the particular kiosk from the central database 110 and show appropriate presentation content. In particular, in the embodiment shown in FIG. 5, the playlist window 502 may display to the user a list of content selected for display to the user based on identification of the user. The list of content may correspond to a list of products selected that the user may be interested in purchasing. A benefit of playlist window 502 is that it allows a user to view a plurality of items and provide input to select particular content for viewing. In the embodiment shown in FIG. 5, the list of content includes "computer deals", audio/video deals", and "weekly specials". In one embodiment, the user selects content from playlist window 502 by providing a voice command regarding the desired content (e.g., user may say, "next item", "skip", "go to item#3", etc.). Another embodiment, either used independently or in conjunction with voice commands, is utilizing gestures—such as swiping arm right to left to skip to the next item—to provide input regarding the content to be displayed. The kiosk will pick up these control commands using camera 250 and/or microphone 260 described with respect to FIG. 2A.

Presentation content window 504 may be used to display a wide array of selected content, including audio clips, real-time synthesized text-to-speech which can be tailored to the user (for instance addressing him/her by name, in his or her native language), video clips, and other graphics overlay widgets. Content displayed in presentation content window 504 may be content selected based on identification of the user, but may also be selected based on input received from the user, such as that described above with respect to providing voice commands or gestures to select content for display. In the embodiment shown in FIG. 5, system message window 506 is used to communicate messages to the user. For example, in the embodiment shown a message is displayed to the user that reads "Hi, I detected a new user in front of me. Pls hold up your token card so I know who you are and can show you content that interests you!". In response to this message, a user would display the assigned visual token card to be identified by touch-free kiosk 104. User-personalized content window 508 is utilized to provide custom messages to the user based on the user's identity. For example, in the embodiment shown in FIG. 5, user-personalized content window 508 provides a message that reads "Hi Paul, based on your past phone purchase, we have some great accessories".

In this way, touch-free interactive kiosk 104 allows unique content to be displayed to the user, as well as allows the user to interact with the kiosk to select/modify the content to be played. In addition, kiosk 104 provides the means to allow these interactions without requiring the user to touch the display or any other external device.

Figure 6:
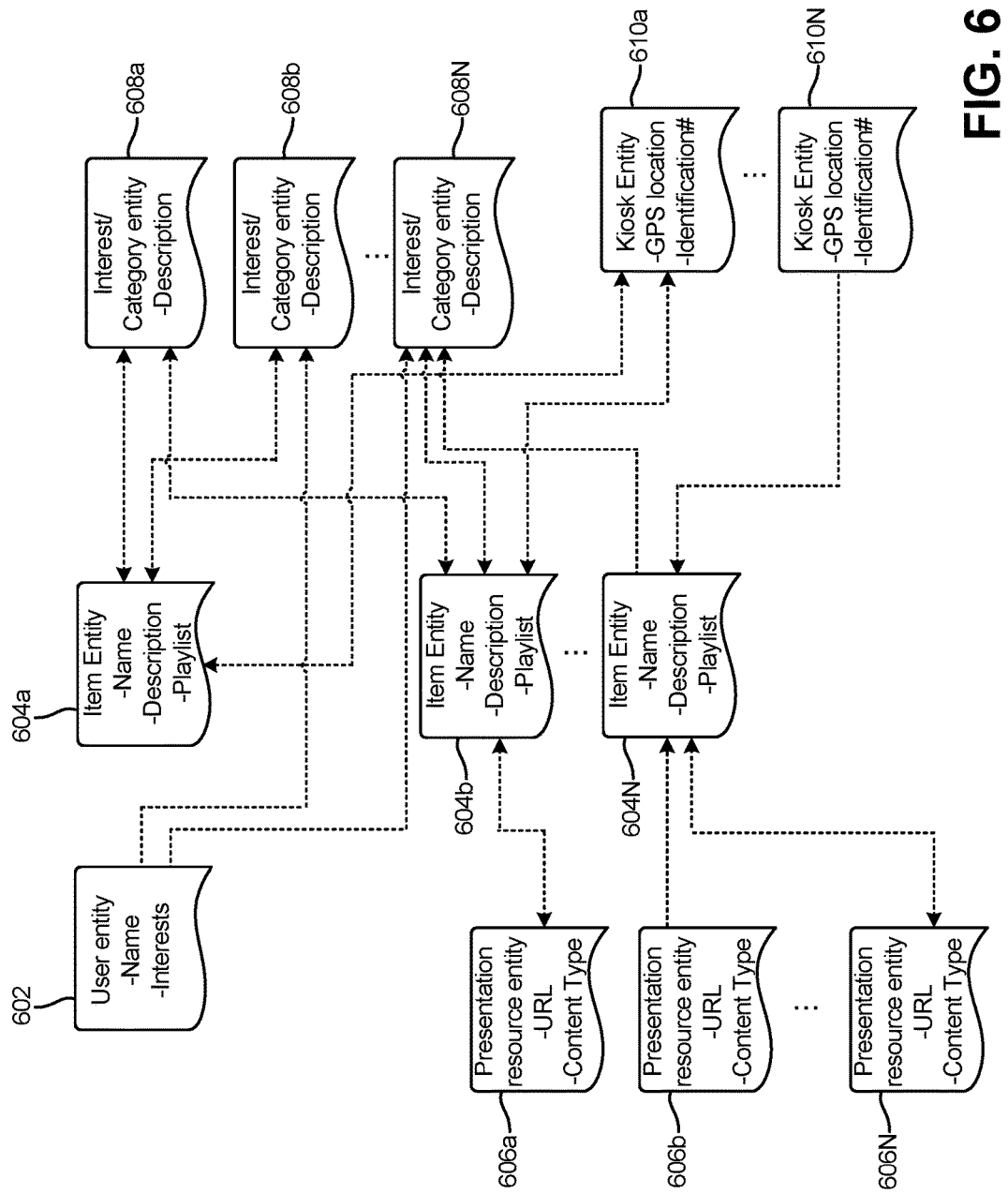
FIG. 6 is a logical view of a core database structure utilized to facilitate interaction with the user according to an embodiment of the present invention.

FIG. 6 is a diagram illustrating the core database structure utilized to facilitate interaction with the user according to an embodiment of the present invention. For example, the embodiment shown in FIG. 6 may represent the organization utilized by central database 110 to determine the content to be displayed to identified users. In the embodiment shown in FIG. 6, the database includes user entities 602, item entities 604, presentation resource entities 606, interest/category entities 608 and kiosk entities 610. With respect to each of the described entities types, a plurality of individual entities may be created within each entity type (e.g., unique item entities 604*a*, 604*b* . . . 604N may be created). In other embodiments, other organizational techniques may be utilized, and more or fewer entity hierarchies may be utilized to achieve the desired functionality.

In the embodiment shown in FIG. 6, user entity 602 is unique to each user registered within the system, and may include stored information including user name and/or interests. This information is typically obtained either from a user profile entered by the user either via the user's device, provided by the user during registration at log-in kiosk 102, or provided by a third-party application (e.g., Facebook) that provides user information and/or user historical data. As discussed in more detail below, interests associated with a user entity 602 provide a logical link to one or more interest/category entities 608. For example, a user entity identified as having an interest in computers may be logically associated with an interest/category entity 608*b* associated with personal computers, and with another interest/category entity 608*c* associated with laptops. Each interest/category entity 608 may include information describing the interest and/or category, and further may include pointers to item entities 604 associated with the interest/category entity 608. For example, an interest/category entity having a description of personal computers may include a point to an item entity 604 that identifies a particular type or brand of personal computer.

In the embodiment shown in FIG. 6, each item entity 604 may include information naming the item, a description of the item, and a playlist of content that can be displayed to the user that is related to the item. For example, returning to the example of an item entity associated with a personal computers, the name of the item entity may identify the model or brand of the personal computer, the description may include information related to specifications of the computer (e.g., processor speed, memory, etc.), and playlist may include pointers to presentation resource entities 606 that are associated with content that can be provided to the user regarding the selected personal computer. In the embodiment shown in FIG. 6, each presentation resource entity 606 includes an URL and a content type indicator, wherein the URL describes the location or address where the content represented by the presentation resource entity 606 is stored (either locally or in the cloud), and content type identifies the media type of the content (e.g., video, audio, etc.). For example, with respect to a particular item entity (e.g., particular brand of personal computer), a presentation resource entity may be associated with the item entity that includes an URL to a video that provides additional information related to the product and that can be displayed to the user via one of the touch-free kiosks. In addition, the database includes kiosk entities 610, which represent real-world kiosks located within the managed space. In the embodiment shown in FIG. 6, each kiosk entity includes information regarding location of the kiosk entity (e.g., GPS location) as well as a unique identification ID. Each kiosk entity 610 is associated with one or more item entities 604. For example, a first kiosk located at a first location within the managed space may be represented within the database as kiosk entity 610a. This kiosk entity may be associated with one or more item entities 604, which in turn may be associated both with one or more presentation resource entities as well as one or more interest/category entities. The first kiosk is therefore equipped to present information to a user regarding the one or more item entities associated with the kiosk entity. However, if the user would like to receive information regarding a different item, then the first kiosk may provide instructions directing the user to the location of the kiosk associated with the item selected by the user (i.e., cross-reference to other kiosks). In particular, the location of the second kiosk is stored as part of the kiosk entity within the database, and can be utilized to actively guide the user towards the correct kiosk.

In this way, upon registration with the system, a user entity 602 is created in the database structure, with associations (i.e., pointers) based on information provided by the user that associates the created user entity with interest/category entities 608. In addition, kiosk entities 610 have been created, which represent real-world kiosks, and include associations to item entities 604 that will be displayed via the represented kiosk. A user approaching a touch-free interactive kiosk—in the real-world—is recognized by the kiosk and is provided with information pertaining to items of interest to the user. If the particular kiosk at which the user is located is not associated with items of interest to the user, the touch-free interactive kiosk may provide directions to the user on which touch-free interactive kiosks are associated with items of interest to the user.

In another embodiment, while a particular item entity 604 is displayed via a particular kiosk entity 610, items related to item entity 604 (e.g., items linked to item entity 604 or linked to the same interest/category entity 608) may be displayed not via the kiosk entity 610, but via the "app" loaded and running on the user's device. In this way, while a particular kiosk entity 610 may be limited to particular content with which it is associated, additional items (e.g., items for which no content exist for display at the kiosk, perhaps) can be displayed. Of course, in other embodiments these additional items may be displayed to the user via the "app" and selected by the user via the "app" or via interaction directly with the touch-free interactive kiosk 104 for display for the kiosk.

Figure 7:
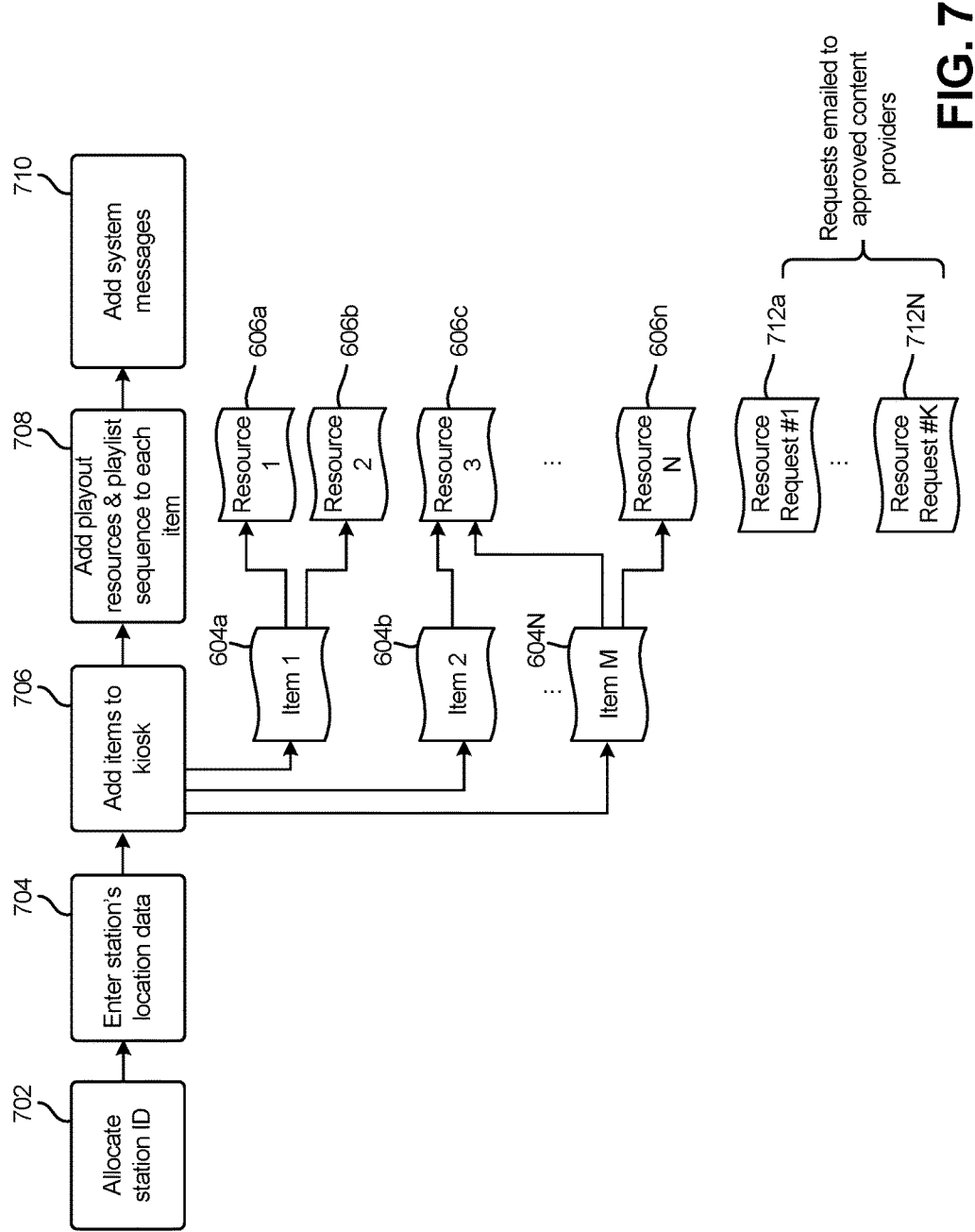
FIG. 7 is a flowchart describing the configuration of a touch-free interactive kiosk according to an embodiment of the present invention.

FIG. 7 is a flow chart describing the configuration of a touch-free interactive kiosk in order to add it to a managed space according to an embodiment of the present invention. That is, FIG. 7 illustrates how an administrator defines the content to be displayed by the touch-free interactive kiosk by associating item entities and associated presentation resource entities with a particular kiosk.

At step 702, a unique station ID is allocated to the touch-free interactive kiosk. The unique station ID is stored as part of the kiosk entity 610 described with respect to FIG. 6 to allow the touch-free interactive kiosk to be uniquely identified. At step 704, the location of the kiosk is entered, which identifies the exact location of the kiosk with respect to a local map of the managed space. Location data may be collected automatically from the kiosk based on GPS data, or may be entered manually by a user. Once again, location data is stored as part of the kiosk entity 610 described with respect to FIG. 6.

At step 706, one or more items will be added to the kiosk selected from a system-wide available list of item categories/product interests. For each item added or associated with the kiosk, an item entity 604 (shown in FIG. 6) is associated with the kiosk entity 610 within the framework of the database. For each item added to a kiosk, one or more presentation resource entities 606 associated with the added item are added to the kiosk via the association with the item entity. In this way, each kiosk is associated with one or more items, and one or more resources associated with each item to present to a user at the kiosk.

At step 708, the system administrator assigns available playout resources to each item. That is, if a presentation resource is not already associated with an item entity, at step 708 an administrator may make the association between a presentation resource and a particular item associated with the kiosk, with the association being stored in the database as a relationship between the presentation resource entity and the item entity. If playout resources are desired but non-existing, the administrator can request his authorized content providers to submit presentation content for these, by entering a description of the requested content illustrated by requests 712a . . . 712N. The system will send out a notification to the content producer(s) to request the desired content. The producer(s) can upload the content, which will subsequently be approved by the administrator before it goes live on the network. Similarly, each item is associated with one or more item categories that will in turn be linked with the interest categories of the user profiles.

At step 710, the administrator enters system-wide messages/announcements 710, wherein each message/announcement may include their own playlist scheduler. In this way, the administrator identifies each station within the managed space, determines the items to be displayed by the kiosk, and the corresponding presentation resources to be associated with each item.

Although not shown in FIG. 7, in addition to configuring the one or more kiosks, the administrator also has access to management tools that allow the administrator to monitor user interaction with the plurality of kiosks. For example, the kiosks can provide data regarding number of users visiting each kiosk, identity/demographic information related to users and items viewed, resources presented, etc. This provides the administrator with a trove of valuable information, usage metrics by person (such as the number of people and time spent in front of each interactive kiosk as well as demographics of those people), as well as usage metrics by item or item category, and by individual presentation resource. With respect to content, the system allows sorting the time spent of users in front of displays by content provider so that the system administrator can gauge the effectiveness of contributed content by provider. As a result an automated rating system for content producers can be developed based on content consumption metrics.

In addition, an administrator of the system may interact with the kiosks within the managed space, either collectively or individually, to send real-time messages to the one or more kiosks. For example, the manager of the store may announce a store-wide sale via messaging to each interactive kiosks, or may interact with a particular user on a one-on-one level via messaging directed to a particular kiosk.

Figure 8:
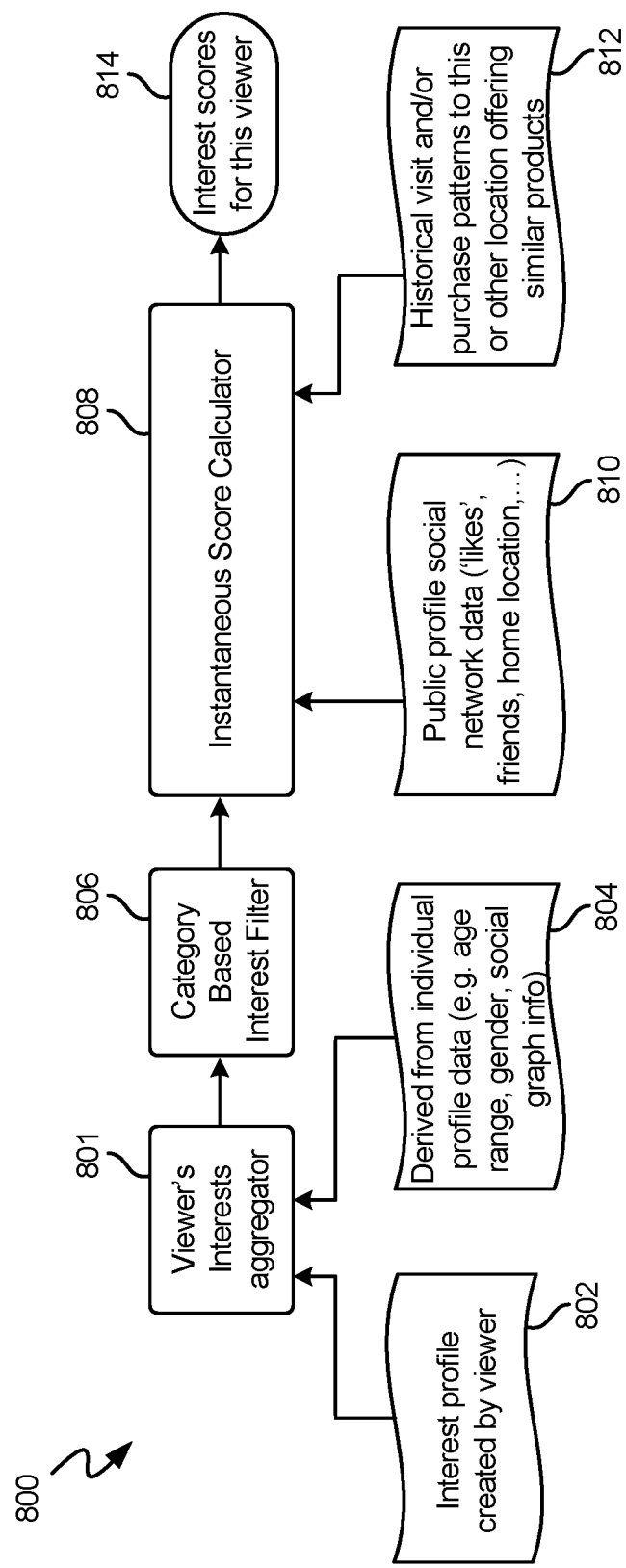
FIG. 8 is a flowchart illustrating a method of calculating an interest score associated with a user based on a plurality of inputs according to an embodiment of the present invention.
Figure 9:
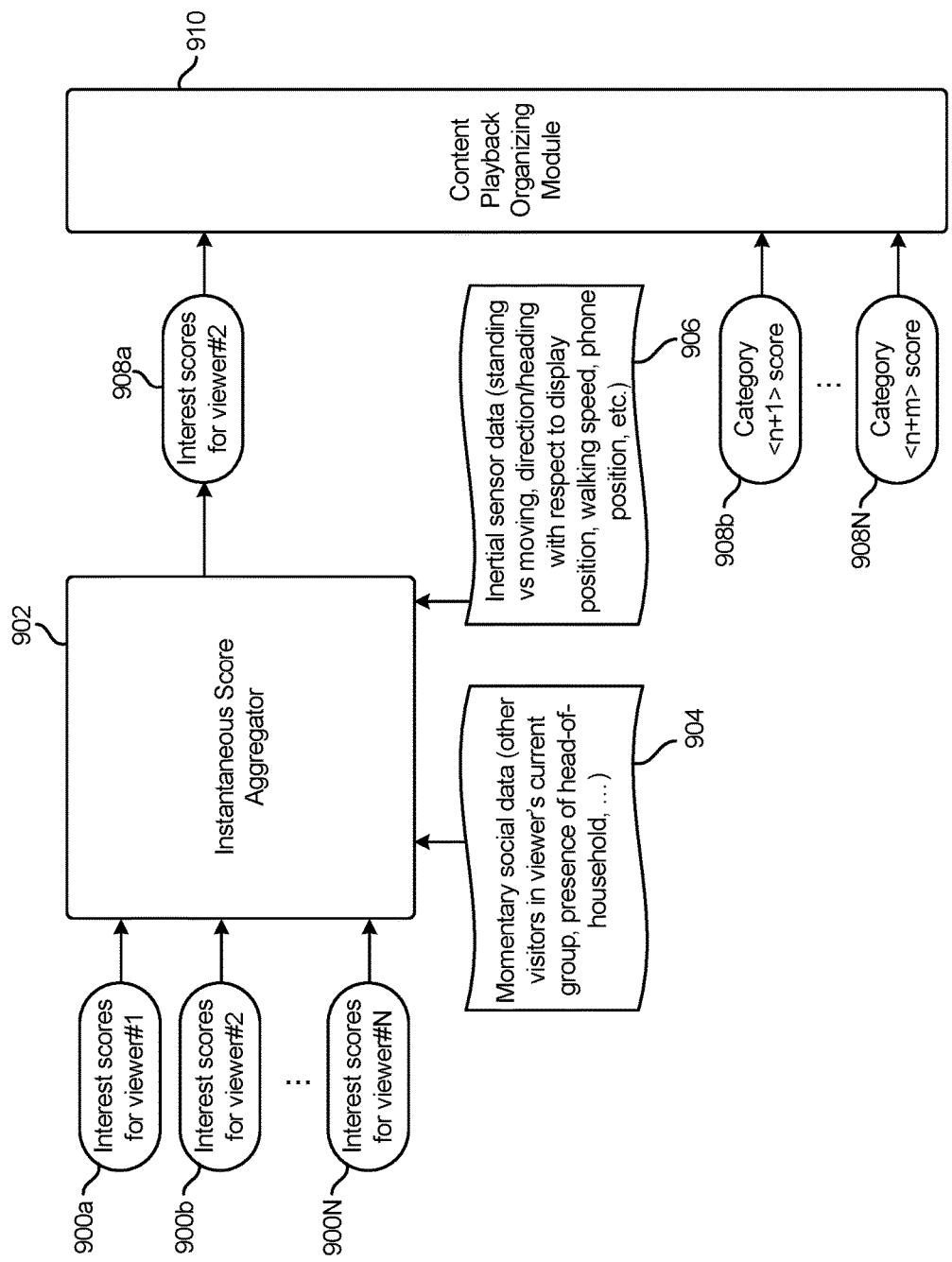
FIG. 9 is a flowchart illustrating a method of prioritizing the content to be displayed to a plurality of users detected near a touch-free interactive kiosk based on a combination of interest scores associated with the plurality of users according to an embodiment of the present invention.

FIGS. 8 and 9 are diagrams that illustrate modules utilized to determine content to be shown at a kiosk when multiple users are located in front of the kiosk according to an embodiment of the present invention. In particular, FIG. 8 illustrates the calculation of instantaneous interest scores for each user with respect to a plurality of interest categories according to an embodiment of the present invention. FIG. 9 is a flowchart that illustrates how the instantaneous interest scores of multiple users physically located in close proximity to a particular kiosk are aggregated to select the items/content to be displayed to the plurality of users according to an embodiment of the present invention.

In the embodiment shown in FIG. 8, modules include: viewer interest aggregator 801, category-based interest filter 806, and instantaneous score calculator 808. These modules may be located locally on touch-free interactive kiosks 104 or remotely as part of central database 110. In the embodiment shown in FIG. 8, viewer interest aggregator 801 collects user information from one or more of a plurality of sources with respect to those users identified as in close proximity to the kiosk. This information can be collected in one of several ways. For example, in one embodiment, user interests are obtained via a profile created by the user that identifies user interest as shown by input 802. As illustrated with respect to FIG. 6, the database may store with respect to each user entity 602 one or more interest/category entities 608, which provides a record of the interest identified by the user. As described above, interests may include categories such as "computers", "video games", etc. In addition, a hierarchy of interest may be utilized, wherein information about a user may indicate that the user is interested in "video games", and more particularly to "flight simulator" games. In addition, user interest may be derived based on general information collected with respect to the user (e.g., demographic information, including one or more of age, gender, social graph info, etc.) as shown by input 804.

In the embodiment shown in FIG. 8, category-based interest filter 806 filters the interests or categories collected by viewer interest aggregator 801 based on content offerings associated with the kiosk at which the user is located. For example, if the user is interested in video games, and in particular flight simulator games, role-playing games, and strategy games, but the kiosk at which the user is located only has content related to flight simulator games and role-playing games, then the category-based interest filter would filter or remove the interest in strategy games from being provided as an input to instantaneous score calculator 808.

Instantaneous score calculator 808 calculates an instantaneous score with respect to each interest received from category based interest filter 806. In the above example, for the user with interests in video games, instantaneous score calculator 808 would provide an instantaneous score for this user with respect to both flight simulator games and role-playing games. In the embodiment shown in FIG. 8, the instantaneous score provides a quantitative method of customizing the default playout schedule at the kiosk. In particular, the instantaneous score is utilized to prioritize which content will have the highest impact when a plurality of users are gathered in front of the kiosk, each having different interests.

In addition to the filtered interests associated with the user, additional inputs may be analyzed to calculate the instantaneous score. For example, in the embodiment shown in FIG. 8, information available on social networks 810 such as friends, 'likes', home location, etc. can be utilized to improve calculation of the instantaneous score associated with the user for each interest category. For example, if a user previously 'liked' a product on a social media site that is related to one of the interest categories, then this may result in a higher calculated instantaneous score for that interest category. In addition, the embodiment shown in FIG. 8 utilizes historical data and/or purchase history patterns associated similar products and/or at similar locations 812. This may also be used to enhance the calculation of the instantaneous score. For example, a user who has a history of purchasing items from this kiosk or a similar kiosk may result in a higher calculated score, indicating that it is more likely that the user will purchase goods or services provided by the kiosk. Similarly, if the user has previously purchased a product similar to one of the items provided by the kiosk, that may result in a higher calculated instantaneous score for an interest category similar or related to the previously purchased product (e.g., if the user previously purchased a cell phone, then a category related to cell phone cases may receive a higher ranking).

In addition to data collected regarding interests of the user, social media info, and/or historical visit and/or purchase data, information regarding the state of the user relative to the managed space and the kiosk may also be utilized in calculating the instantaneous score. For example, if the camera associated with the kiosk determines that the user is standing still and viewing the display (i.e., interested in what is being displayed), then the instantaneous score associated with the user may be increased. Alternatively, if the user is moving (e.g., walking past the display), or it is determined that the user is not looking at the display, then the instantaneous score associated with the user may be decreased. In addition, if the user being evaluated is identified as the head-of-household associated with a plurality of users (e.g., identification of a parent as opposed to a young child), then the instantaneous score of the user may be increases. In contrast, identification of the user at the kiosk as a young child may result in the instantaneous score of the user being decreased. Differentiation between adults and children may be based on profile information, or may be based on input received from the video camera located at the kiosk. In another embodiment, the simultaneous presence of the user's friends at this location (but possibly at other display stations as well) may increase the instantaneous score of the user as there may be a possible larger resulting group purchase. In addition, other metrics or means for calculating an instantaneous score (i.e., determining which content will have the highest impact on individual users) may be utilized to prioritize the content displayed via the kiosk.

Although not shown in FIG. 8, instantaneous score calculator 808 may also generate the score based on the content associated with kiosk 104. For example, returning to the example of the user that has interest in both role-playing games and flight simulator games, the instantaneous score calculator 808 will increase the score related to role-playing games based on knowledge that one of the items associated with the kiosk is a role-playing game.

The output of instantaneous score calculator 808 is an interest score for each user located in close proximity to the kiosk. In one embodiment, the interest score is for each interest identified by the user. For example, the user would have an instantaneous score associated with the user's interest in role-playing games and an instantaneous score associated with the user's interest in flight simulator games. The higher the score, the better the indication that content associated with or assigned to the kiosk will have an impact on the user or be successful (e.g., successful in selling a product to the user). In response to the calculated instantaneous interest scores, the kiosk can generate custom content playlists.

FIG. 9 is a block diagram illustrating how the instantaneous scores calculated as described with respect to FIG. 8 can be combined by instantaneous score aggregator 902 to select content that will have the largest (i.e., most successful) impact on a plurality of users, each defined by their own interests and likes. Once again, instantaneous score aggregator 902 may be local to kiosk 104 or may be located remotely at central database 110.

In the embodiment shown in FIG. 9, instantaneous score aggregator 902 receives as inputs the instantaneous scores 900a, 900b . . . 900N (collectively, instantaneous scores 900) calculated for each of the users identified as present at the kiosk. The instantaneous scores 900 are calculated according to the method described with respect to FIG. 8. In the embodiment shown in FIG. 9, in addition to the instantaneous scores 900, additional inputs may be utilized, including momentary social data 904 and/or inertial sensor data 906. Momentary social data 904 includes data such as other visitors located in the group located near the kiosk, whether the head of the household is present in the group in front of the kiosk (e.g. a parent), etc. In some embodiments, this information may already be incorporated into the instantaneous score calculated with respect to FIG. 8, or may be re-calculated as shown in FIG. 9 to account for changes in users located near the kiosk. Inertial sensor data 906 may be collected from a user device, and utilized to determine, for example, if a particular user is standing still or moving, whether the user is heading toward the display or away from it. As discussed with respect to momentary social data 904, this information may be utilized to calculate instantaneous scores as described with respect to FIG. 8, or may be utilized as shown in FIG. 9 to modify calculated instantaneous scores.

An instantaneous score 908a, 908b, . . . 908N is calculated for each category/interest offered at the kiosk by weighing each user's contribution to the score. That is, instantaneous scores calculated for each interest category associated with each user are weighted (e.g., summed) to calculate a category score 908a, 908b . . . 908N for each interest category associated with the kiosk. For example, it could be as simple as adding together the instantaneous interest scores each user has for each of the plurality of categories, and providing the ordered sum of scores as an output, with the highest score representing the category that carries the most interest for the group of users as a whole. In other embodiments, more complex aggregation of the category scores may be utilized.

Content playback organizing module 910 ranks/prioritizes the content (e.g., category playback items) to be displayed to the user based on the one or more category scores 908. In this way, playback items are selectively customized based on information received regarding the plurality of users located at the kiosk. As the users located at the kiosk change, the ranking/prioritization of the playlist may change and different content may be displayed to increase the impact on the new/remaining users located at the kiosk.

In this way, the embodiment shown in FIG. 9 provides a way to optimize the content displayed to a group of users in order to provide the largest impact. If reduced to a single user, the kiosk would operate as described previously to optimize the content displayed to the single user.

Figure 10:
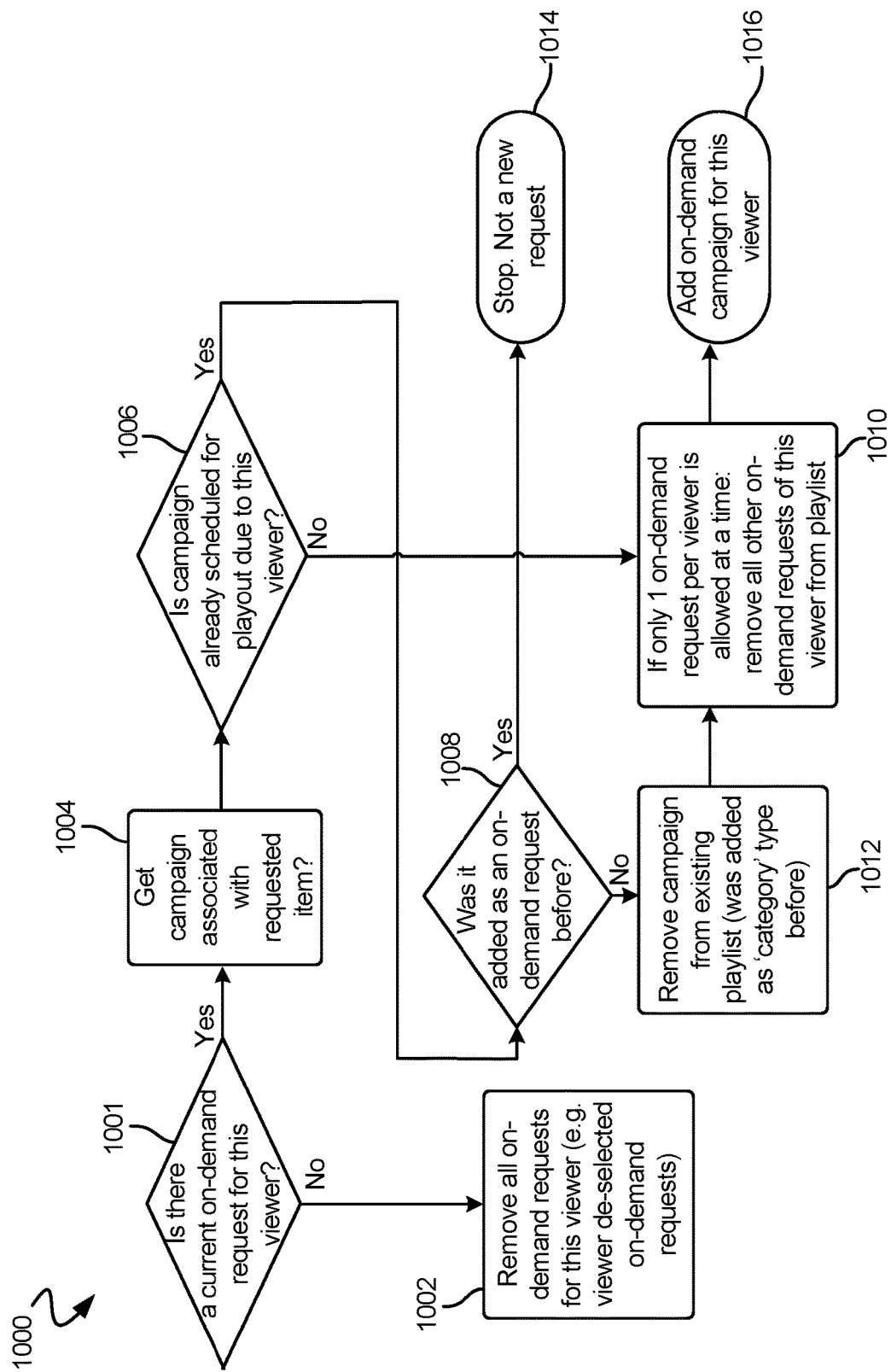
FIG. 10 is a flowchart illustrating a method of handling an active viewer request for content associated with a particular viewer according to an embodiment of the present invention.

FIG. 10 is a flowchart illustrating a method of handling an active viewer request for content associated with a particular viewer according to an embodiment of the present invention. In contrast with the embodiment shown in FIG. 9, in which content is selected to display to a user or group of users based on information obtained from the users, but without active user participation, FIG. 10 illustrates a method that allows the user to actively participate with the kiosk to play desired content. The method described with respect to FIG. 10 is performed with respect to each user located in close proximity to the kiosk.

At step 1000, it is determined whether the selected user has made any on-demand or "active" request for content. If no, then at step 1002 any on-demand requests previously made by the user (and subsequently de-selected) are deleted from the queue of on-demand requests. As described above, a user may be presented with a list of content available to view, and may select, either through voice command, gestures, or through interaction with an app residing on the user's smartphone particular content to be displayed. If at step 1000 it is determined that the user has made an active request for content, then at step 1004 the kiosk retrieves or loads a campaign associated with the requested content or item. For example, the campaign may be associated with a particular item the user is interested in, and may be comprised of a list of content to be displayed to the user.

At step 1006, a determination is made whether the content associated with the selected campaign is already scheduled to be played by the kiosk. This may be as a result of the kiosk selecting the content to be displayed based on information retrieved about the user (e.g., passively selected), or may be a result of another user at the kiosk either actively selecting the campaign (or as a result of the same user making a duplicitous request). If the campaign was not already scheduled for playout, it is determined that this is a new request for the campaign and should therefore be played. However, in the embodiment shown in FIG. 10, each user is afforded one campaign request at a time, and therefore at step 1010 any other on-demand requests made by the same user are removed from the playlist. At step 1016, the campaign associated with the on-demand content is displayed at the kiosk.

If at step 1006 it is determined that the campaign is already scheduled for playout, then at step 1008 a determination is made regarding whether the on-demand request was previously added as an on-demand request by the same user. If the on-demand request was previously added as an on-demand request by the same user, then at step 1014 it is determined that the request is not new and no additional steps are necessary. If the on-demand request was not previously added as an on-demand request by the same user, this indicates that it was passively scheduled to be played based on information retrieved regarding one or more users. As a result, at step 1012 the campaign—previously loaded—is removed from the existing playlist to allow the actively requested campaign to be given higher priority. At step 1010, any other on-demand requests made by the user are removed from the playlist. At step 1016 the on-demand campaign is displayed at the kiosk.

In this way, the embodiment shown in FIG. 10 allows a user to actively select content to be displayed. This may be in conjunction with embodiments described previously that act to customize content displayed to the user.

Figure 11:
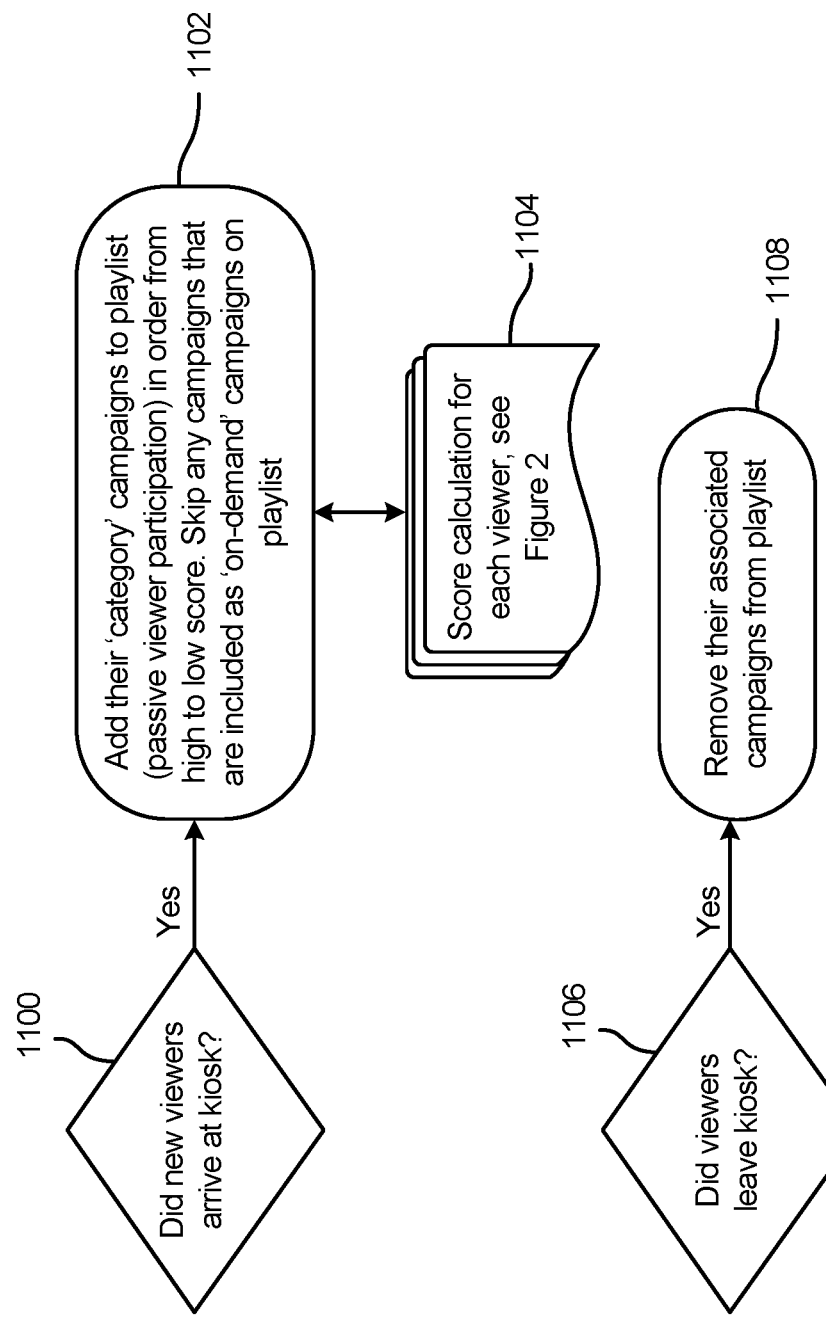
FIG. 11 is a flowchart illustrating a method of managing the playlist of content maintained by the kiosk when multiple users are detected in close proximity to the kiosk according to an embodiment of the present invention.

FIG. 11 is a flowchart illustrating a method of managing the playlist of content displayed by the kiosk when multiple users make requests for content according to an embodiment of the present invention. In the embodiment shown in FIG. 11, at step 1100, a determination is made regarding whether new users have arrived at the kiosk. If it is determined that no additional users have arrived, then no further action is taken. If new users have arrived at the kiosk, then at step 1102 the instantaneous scores of the user corresponding to categories associated with the kiosk are incorporated into the passive determination of which content campaigns to display as illustrated by the input labeled "Score calculation for each viewer as shown in FIG. 9". However, for campaigns that are already scheduled to be played, either as a result of previous passive viewer participation or as a result of active requests from users, duplicate campaigns are prevented from being added to the playlist.

At step 1106, a determination is made whether viewers have left the vicinity of the kiosk. In response to a viewer leaving the kiosk, the associated campaigns added by the user, either actively by the user or passively as a result of scoring associated with user categories, the associated campaigns are removed from the playlist at step 1108.

Figure 12:
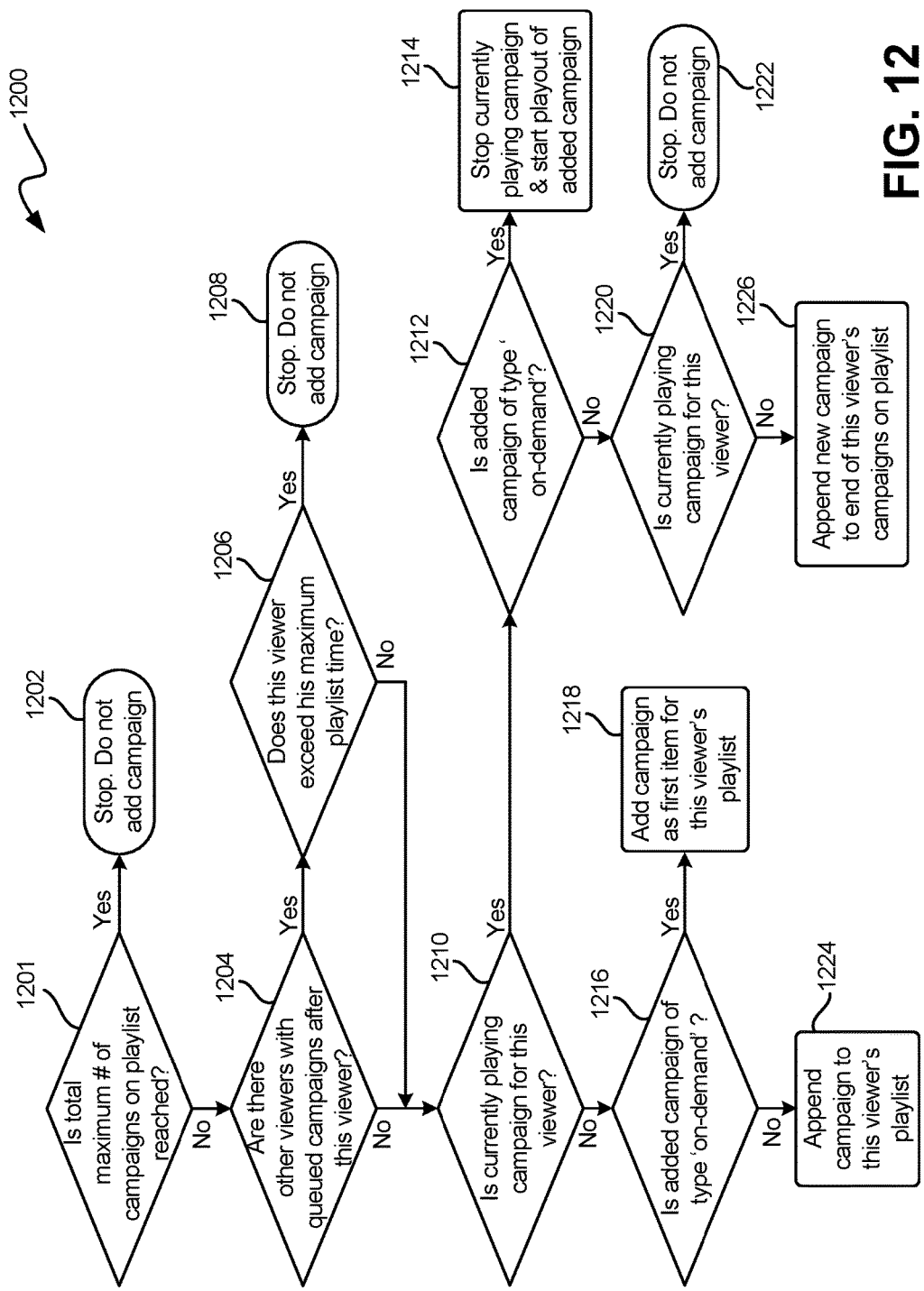
FIG. 12 is a flowchart illustrating a method of generating a playlist in response to proximity of a plurality of users, including users issuing active requests and users participating only passively according to an embodiment of the present invention.

FIG. 12 is a flowchart illustrating a method of managing a playlist of content displayed to a plurality of users that includes active request users and passive viewer participation. In particular, FIG. 12 details how to handle multiple active requests from a plurality of different users. The method is described from the perspective of a user attempting to make an active request for additional content to be displayed.

At step 1200, a determination is made whether a maximum number of campaigns have been queued on the playlist. If a maximum number of campaigns have been queued, then at step 1202 the campaign is not added and a message is provided to the user indicating that the maximum number of user requests has been reached.

If the maximum number of campaigns has not been reached, then at step 1204 a determination is made whether there are other users with queued campaigns after the viewer whose queued content is currently playing. Essentially, the question is: are there other users waiting to have content or campaigns played which are related to the content they are interested in. If so, then at step 1206 a determination is made whether the user trying to add a campaign has exceeded or will exceed the maximum allowed playlist time. If the user will exceed the maximum allowed playlist time, then the content or campaign requested by the user is not added (as shown at step 1208) and a message is communicated to the user to that effect.

If at step 1204 there are no other users with campaigns or content queued to be played, or if at step 1206 the user has not exceeded his maximum playlist time, then the method continues at step 1210 with a determination of whether content or a campaign is currently being played for the user attempting to add a new campaign. If the content or campaign currently being displayed by the kiosk is being played with respect to the user making the request to play different content, then at step 1212 a determination is made whether the content being requested is of the active (i.e., on-demand) type or is the content to be added based passive analysis of the user (e.g., instantaneous score value of the user being used to select content). If at step 1212 it is determined that the campaign type being added is of the on-demand type, then at step 1214 the kiosk stops playing the current campaign and/or content and begins playout of the added campaign. If at step 1212 it is determined that the campaign type being added is not of the on-demand type (i.e., is being added as passively in response to analysis of the user's likes and dislikes), then at step 1220 a determination is made whether the campaign to be added is already queued in the playlist for the user. If at step 1220 it is determined that the campaign to be added is already queued on the playlist, then at step 1222 the campaign is not added to the playlist and the method ends. If at step 1220 it is determined that the campaign is not already queued on the playlist, then at step 1226 the new campaign is appended to the campaign playlist.

If back at step 1210 it is determined that the campaign being played currently is for the user requesting that a new campaign or content be added, then at step 1216 a determination is made whether the campaign to be added is of the on-demand type. If the campaign to be added is of the on-demand type, then at step 1218 the campaign is added as the first item or content to be displayed in the playlist. If at step 1216 it is determined that the content being added is not of the on-demand type, then the campaign to be added is appended to the user's playlist for playback in the order in which it was added to the queue. In this way, in the embodiment shown in FIG. 12, content actively requested by the user is given priority over content that is being passively added to the playlist based on calculated expectations that the content will appeal to the user.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of displaying content to a user within a managed space that includes one or more kiosks for displaying content, the method comprising:
    collecting user data about the user;
    emitting a radio frequency (RF) signal at the one or more kiosks, wherein the signal includes an identification (ID) that uniquely identifies the kiosk emitting the signal;
    determining a location of the user relative to the one or more kiosks based on a measured attribute of the RF signal measured at a user's handheld device and the ID of the emitted RF signal;
    identifying the user at one of the plurality of kiosks based on the determined location of the user relative to the kiosk;

selecting content to display to the user based on the identification of the user and the user data collected; and displaying the selected content to the identified user at the kiosk at which the user is located.

2. The method of claim 1, wherein collecting user data about the user includes one or more of collecting user data from the user at a sign-in station, collecting user data about the user from a social media website, and/or scanning a card provided by the user that includes user data.

3. The method of claim 1, further including receiving the measured RF signal attribute measured by the user's handheld device at the kiosk that emitted the signal, wherein the kiosk determines the location of the user relative to the kiosk based on the measured signal attribute.

4. The method of claim 1, further including receiving the measured RF signal attribute measured by the user's handheld device at a central database, wherein the central database determines the location of the user relative to the kiosk that emitted the measured RF signal based on the received signal attribute.

5. The method of claim 1, wherein the kiosk selects content to display to the user at the kiosk closest to the user based on the collected user data determined location of the user relative to the one or more kiosks.

6. The method of claim 1, wherein identifying the user at one of the plurality of kiosks includes utilizing an application stored on the user's handheld device that communicates an identification associated with the user.

7. The method of claim 1, wherein the user's handheld device determines the location of the user relative to the kiosk that emitted the measured RF signal based on the received signal attribute.

8. The method of claim 1, further including providing additional content to be displayed on the user's handheld device that is related to the content selected for display at the kiosk at which the user is located.

9. The method of claim 1, further including configuring each kiosk to be associated with one or more of a plurality of item entities, wherein the kiosk is configured to selectively display content associated with the item entities assigned to the kiosk based on collected user data.

10. The method of claim 9, wherein selecting content to display to the user includes assigning for each user identified at one of the plurality of kiosks an instantaneous score for each item entity associated with the kiosk, wherein a higher score indicates that content related to the item entity is more relevant to the user.

11. The method of claim 10, wherein when a plurality of users are located at a single kiosk, selecting content to display is based on an aggregation of instantaneous scores calculated for each of the plurality of users.

12. The method of claim 1, further including receiving an active request for specific content from a user, wherein active requests for content from users are given higher priority that content selected based on collected user information.

13. The method of claim 1, further including:
receiving a message from a user located at one of the plurality of kiosks; and
displaying the received message at one or more of the plurality of kiosks within the managed space to enable location-based group chat within the managed space.

14. The method of claim 1, further including:
providing a request to a user to submit presentation content; and receiving content from one or more users in response to the provided request, wherein received content is aggregated and displayed to users at one or more of the plurality of kiosks.

15. A system for displaying content to one or more users within a managed space, the system comprising:
a plurality of touch-free interactive kiosks located within the managed space that each operate to identify users in close proximity to the kiosks and display content selected for the identified user, wherein each touch-free interactive kiosk includes a radio frequency (RF) emitting device that emits a RF signal that includes an identification (ID) of the kiosk emitting the RF signal, wherein an attribute of the RF signal is measured by a user's handheld device; and
a central database that stores content to be selectively distributed to the plurality of touch-free interactive kiosks, and collected user information and identifying information;
wherein the measured attribute of the signal is utilized to determine a location of the user relative to the kiosk that emitted the RF signal, and wherein content is selected for display to the user at the kiosk at which the user is located.

16. The system of claim 15, further including a sign-in station that collects user information and identifying information from a user.

17. The system of claim 16, wherein the sign-in station assigns users a unique identification entity that is presented by the user to each of the plurality of touch-free interactive kiosks to identify the user to the kiosk.

18. The system of claim 15, wherein the measured RF signal attribute is communicated to the kiosk via the central database, wherein the kiosk utilizes the measured RF signal attribute to determine a location of the user relative to the kiosk.

19. The system of claim 15, wherein the measured RF signal attribute is communicated to the central database, wherein the central database utilizes the measured RF signal attribute to determine a location of the user relative to the kiosk.

20. The system of claim 15, wherein the hand-held device utilizes the measured RF signal attribute to determine a location of the user relative to the kiosk, wherein the location of the user is communicated to the central database.

21. The system of claim 20, wherein the touch-free interactive kiosk distributes additional content for display on the user's hand-held device, wherein the additional content is selected based on content displayed at the one or more touch-free interactive kiosks.

22. The system of claim 15, further including:
an instantaneous score calculator associated with one or more of the touch-free interactive kiosks that calculates instantaneous score for each user with respect to a plurality of categories/interests offered by the kiosk, wherein content is selected for display by the kiosk based on the calculated instantaneous score.

23. The system of claim 22, further including:
an instantaneous score aggregator that aggregates calculated instantaneous scores for a plurality of users to generate a category score for each category/interest offered by the kiosk; and
a content playback organizing module that selects an order in which content is displayed based on the instantaneous scores provided by the instantaneous score aggregator.

24. The system of claim 23, wherein the instantaneous score calculator, the instantaneous score aggregator and the content playback organizing module are implemented locally on each of the touch-free interactive kiosks.

25. The system of claim 23, wherein the instantaneous score calculator, the instantaneous score aggregator and the content playback organizing module are implemented on the central database.

26. The system of claim 15, wherein the plurality of touch-free interactive kiosks receive active requests from users regarding content, wherein the touch-free interactive kiosks prioritizes active requests over content selected for the user based on collected user information.

27. The system of claim 15, wherein the central database generates a request for user-generated content and provides the request to users via the one or more touch-free interactive kiosks, when user-generated content is collected and aggregated by the central database and displayed to users via the one or more touch-free interactive kiosks.

* * * * *